United States Patent [19]
Bliss et al.

[11] Patent Number: 6,009,549
[45] Date of Patent: Dec. 28, 1999

[54] DISK STORAGE SYSTEM EMPLOYING ERROR DETECTION AND CORRECTION OF CHANNEL CODED DATA, INTERPOLATED TIMING RECOVERY, AND RETROACTIVE/SPLIT-SEGMENT SYMBOL SYNCHRONIZATION

[75] Inventors: William G. Bliss, Thornton; Christopher P. Zook, Longmont; Richard T. Behrens, Lafayette, all of Colo.

[73] Assignee: Cirrus Logic, Inc., Fremont, Calif.

[21] Appl. No.: 08/856,885

[22] Filed: May 15, 1997

[51] Int. Cl.[6] ............................... C11C 29/00; G11B 5/09
[52] U.S. Cl. ............................. 714/769; 714/775; 360/51
[58] Field of Search ............................... 371/40.11, 40.2, 371/40.3, 40.4, 40.13, 40.14, 40.15, 39.1, 42, 43.1, 43.2, 43.3, 43.6; 360/50, 51, 48, 53; 375/355

[56] References Cited

U.S. PATENT DOCUMENTS

| | | | |
|---|---|---|---|
| 4,887,224 | 12/1989 | Okano et al. | 345/516 |
| 5,291,499 | 3/1994 | Behrens et al. | 371/43 |
| 5,297,184 | 3/1994 | Behrens et al. | 375/345 |
| 5,311,521 | 5/1994 | Fitingof et al. | 714/762 |
| 5,424,881 | 6/1995 | Behrens et al. | 360/40 |
| 5,473,621 | 12/1995 | Wei | 375/303 |
| 5,698,639 | 12/1997 | Spurbeck et al. | 360/51 |
| 5,771,248 | 6/1998 | Katayama et al. | 714/752 |
| 5,844,920 | 11/1996 | Zook et al. | 360/51 |

OTHER PUBLICATIONS

M. Mansuripur, "Enumerative Modulation Coding with Arbitrary Constraints and Post–Modulation Error Correction Coding for Data Storage Systems," *SPIE, Optical Data Storage,* 1991, pp. 72–86.

Thomas M. Cover, "Enumerative Source Encoding," *IEEE Transactions on Information Theory,* vol. IT–19, No. 1, Jan. 1973., pp. 73–77.

Yinyi Lin and Jack Wolf, "Combined ECC/RLL Codes," *IEEE Transactions on Magnetics,* vol. 24, No. 6, Nov. 1988, pp. 2527–2529.

W. G. Bliss, "Circuitry for Performing Error Correction Calculations on Baseband Encoded Data to Eliminate Error Propagation," *IBM Technical Disclosure Bulletin,* vol. 23, No. 10, Mar. 1981.

Kees A. Schouhamer Immink, "A Practical Method for Approaching the Channel Capacity of Constrained Channels," Jan. 20, 1997.

*Primary Examiner*—Emmanuel L. Moise
*Attorney, Agent, or Firm*—Howard H. Sheerin; Dan A. Shifrin

[57] ABSTRACT

A disk storage system is disclosed wherein user data received from a host system is first encoded according to a first channel code having a high code rate, and then encoded according to an ECC code, such as a Reed-Solomon code, wherein the ECC redundancy symbols are encoded according to a second channel code having low error propagation. In the preferred embodiment, the first channel code is a RLL (d,k) code having a long k constraint which allows for longer block lengths (and higher code rates). During read back, a synchronous read channel samples the analog read signal asynchronously and interpolates the asynchronous sample values to generate sample values substantially synchronized to the baud rate. In contrast to conventional synchronous-sampling timing recovery, interpolated timing recovery can tolerate a longer RLL k constraint because it is less sensitive to noise in the read signal and not affected by process variations in fabrication. Additionally, a trellis sequence detector detects an estimated binary sequence from the synchronous sample values, wherein a state transition diagram of the trellis detector is configured according to the code constraints of the first and second channel codes. The estimated binary sequence output by the sequence detector is buffered in a data buffer to facilitate the error detection and correction process, and to allow for retroactive and split-segment symbol synchronization using multiple sync marks.

37 Claims, 12 Drawing Sheets

DISK STORAGE SYSTEM EMPLOYING ERROR DETECTION AND CORRECTION OF CHANNEL CODED DATA, INTERPOLATED TIMING RECOVERY, AND RETROACTIVE/SPLIT-SEGMENT SYMBOL SYNCHRONIZATION

CROSS-REFERENCE TO RELATED PATENTS AND APPLICATIONS

This patent application is related to other U.S. patents and patent applications. Namely, U.S. patent application Ser. No. 08/308,179 entitled "MINIMUM LATENCY ASYNCHRONOUS DATA PATH CONTROLLER IN A DIGITAL RECORDING SYSTEM," now abandoned, Ser. No. 08/681,578 entitled "SUB-SAMPLED DISCRETE TIME READ CHANNEL FOR COMPUTER STORAGE SYSTEMS," now U.S. Pat. No. 5,802,118, Ser. No. 08/815,881 entitled "TRELLIS CODING SYSTEM FOR DISC STORAGE SYSTEMS," Ser. No. 08/745,913 entitled "THERMAL ASPERITY COMPENSATION USING MULTIPLE SYNC MARKS FOR RETROACTIVE AND SPLIT SEGMENT DATA SYNCHRONIZATION IN A MAGNETIC DISK STORAGE SYSTEM," now U.S. Pat. No. 5,844,920, Ser. No. 08/341,251 entitled "SAMPLED AMPLITUDE READ CHANNEL COMPRISING SAMPLE ESTIMATION EQUALIZATION, DEFECT SCANNING, CHANNEL QUALITY, DIGITAL SERVO DEMODULATION, PID FILTER FOR TIMING RECOVERY, AND DC OFFSET CONTROL," now U.S. Pat. No. 5,424,881 now abandoned, Ser. No. 08/012,266 entitled "SYNCHRONOUS READ CHANNEL," and U.S. Pat. No. 5,297,184 entitled "GAIN CONTROL CIRCUIT FOR SYNCHRONOUS WAVEFORM SAMPLING," U.S. Pat. No. 5,291,499 entitled "METHOD AND APPARATUS FOR REDUCED COMPLEXITY VITERBI-TYPE SEQUENCE DETECTORS," U.S. Pat. No. 5,446,743 entitled "COEFFICIENT UPDATE METHOD AND APPARATUS FOR REED-SOLOMON DECODER," and U.S. Pat. No. 5,467,297 entitled "FINITE FIELD INVERSION". The above referenced patents and patent applications are hereby incorporated by reference.

FIELD OF INVENTION

The present invention relates to disk storage systems, particularly to error detection and correction in the channel code domain (e.g., (d,k) run-length limited (RLL) data) in order to avoid error propagation, recovery of timing information using a long k constraint, and retroactive/split-segment symbol synchronization.

BACKGROUND OF THE INVENTION

Magnetic and optical disk storage devices are commonly used by host computer systems to store large amounts of digital data in a non-volatile manner. Typically, a disk storage medium spinning within the storage device is partitioned into a number of radially spaced concentric or spiral data tracks, where each data track is further partitioned into a number of data sectors. To write and read data to and from a target data sector on a particular track, a recording head (read/write head) is positioned over the track by an electro-mechanical serving mechanism. Then, to write to the track, the data serves to modulate a current in a write coil or intensity of a laser beam of the recording head in order to write a sequence of corresponding magnetic flux or optical transitions onto the surface of the disk. To read this recorded data, the recording head again passes over the track and emits an analog read signal comprising a sequence of polarity alternating pulses induced by the transitions representing the recorded data. These pulses are then detected and decoded into an estimated data sequence by a read channel and, in the absence of errors, the estimated data sequence matches the recorded data sequence.

A conventional data path in a disk storage system is shown in FIG. 2. User data from a host system is transmitted to a disk controller 2 where it is stored in a data buffer 4. The data buffer 4 may perform a conventional disk caching function depending on its size. The user data is read from the data buffer 4 (as arbitrated by controller 6) and then written to the disk using write/read circuitry 9 in a synchronous read channel 8. As it is written to the disk, a redundancy generator 10 processes the user data to generate redundancy symbols which are appended to the user data to form a code word of an error correcting code (ECC). The Reed-Solomon code is the most common error correcting code employed in disk storage devices currently on the market. The above referenced U.S. Pat. No. 5,446,743 entitled "COEFFICIENT UPDATE METHOD AND APPARATUS FOR REED-SOLOMON DECODER" illustrates one possible embodiment of an ECC encoder/decoder that could be employed in the present invention.

The synchronous read channel 8 typically comprises a channel encoder 11 for encoding the ECC code words according to a channel code before writing the data to the disk. The channel code may implement a simple run-length limited (RLL) code, such as a conventional RLL (d,k) code, and possibly a more complex code, such as a spectral shaping code or a trellis code. The RLL (d,k) code constrains to d the minimum distance in "bit cells" between consecutive transitions (i.e., the minimum number of "0" bits that must occur between consecutive "1" bits), and constrains to k the maximum distance in "bit cells" between consecutive transitions (i.e., the maximum number of consecutive "0" bits). The d constraint mitigates the interference between consecutive transitions known as partial erasure, and the k constraint ensures that sufficient timing information can be extracted to maintain proper bit synchronization during a read operation (i.e., proper self-clocking).

Upon read back, write/read circuitry 9 detects an estimated binary sequence from samples of the analog read signal, and a sync detector 12 symbol synchronizes the data stream (i.e., delineates the symbol boundaries) by detecting a sync mark in the estimated binary sequence. Once symbol-synchronized, a channel decoder 13 decodes the estimated binary sequence according to the reverse operation of the channel encoder 11, thereby generating detected ECC code words which may or may not contain symbols in error. The detected code words are then transferred to the disk controller 2 and stored in the data buffer 4. Typically, ECC syndromes are also generated by a syndrome generator 10 as the detected code words are transferred from the read channel. An error detection and correction circuit 15 processes the ECC syndromes to detect and correct errors in the code words, and the corrected user data portion of the code words is then transferred to the host system.

It is well known that the amount of error propagation that can occur when decoding the channel code can impact significantly the effectiveness of the ECC decoder. It is also well known that in decoding the channel code the amount of error propagation tends to grow exponentially as the realized code rate approaches the theoretical capacity (Shannon capacity) of the coding constraints. Thus, the conventional data path of FIG. 2 has precluded the use of longer channel block codes with code rates closer to the theoretical capacity in order to minimize error propagation.

A paper published in the IBM Technical Disclosure Bulletin, Vol. 23, No. 10, March 1981, entitled "CIRCUITRY FOR PERFORMING ERROR CORRECTION CALCULATIONS ON BASEBAND ENCODED DATA TO ELIMINATE ERROR PROPOGATION," discloses a method for performing error correction on the channel encoded data in order to avoid the above described error propagation that occurs if the error correction is performed on the decoded data as in FIG. 2. This technique enables the use of significantly longer channel block lengths (and significantly higher code rates) because errors are corrected before decoding. Conceptually, the user data is encoded using a first channel code (e.g., RLL (d,k)), and the channel encoded data encoded according to an ECC code, such as a Reed-Solomon code. The ECC redundancy generated by the ECC code will typically not satisfy the constraints of the first channel code and, therefore, must be re-encoded using a second channel code with low error propagation (i.e., with a lower code rate) before writing the data to the disk. Upon read back, the ECC redundancy symbols are first decoded using the second channel code, and then used to correct errors in the encoded user data. The corrected user data is then decoded using the first channel code and transferred to the host system. Error propagation does not occur in the decoding process since the user data is corrected before decoding. The present invention discloses various improvements to this basic idea, and overcomes certain problems not currently addressed by the prior art.

One aspect of the present invention concerns timing recovery and, in particular, the problem presented by a long k constraint in a RLL (d,k) channel code. As described in greater detail below, timing recovery in synchronous read channels is typically implemented by synchronizing the sampling of the analog read signal using a variable frequency oscillator (VFO) in a phase-lock loop (PLL). Synchronously sampling the analog read signal typically requires a relatively short k constraint due to the noise sensitivity and fabrication variances of the VFO. However, it is difficult to construct long code words and thereby achieve higher code rates with a short k constraint.

In another aspect of the present invention, the synchronous read channel employs sub-sampling (sampling significantly below the baud rate) together with a channel code that minimizes the bit error rate in the presence of sub-sampling. The sub-sampling channel code can be constructed using a long block length and thereby achieve an efficient code rate because the above described error propagation in the channel decoder is avoided.

Another aspect of the present invention is to modify the read channel detection algorithm according to the code constraints of the first and second channel codes for encoding the user data and redundancy symbols, respectively, in order to minimize the bit error rate in the detected data sequence.

Still another aspect of the present invention is to improve the symbol synchronization function of the storage system through the use of multiple synchronization marks together with retroactive and split-segment symbol synchronization.

SUMMARY OF THE INVENTION

A magnetic disk storage system is disclosed wherein user data received from a host system is first encoded according to a first channel code having a high code rate, and then encoded according to an ECC code, such as a Reed-Solomon code, wherein the ECC redundancy is encoded according to a second channel code having low error propagation. In the preferred embodiment, the first channel code is a RLL (d,k) code having a long k constraint which allows for longer block lengths (and higher code rates). During read back, the analog read signal is processed by a synchronous read channel for detecting an estimated binary data sequence. The analog read signal is sampled a synchronously, and the asynchronous samples processed by an interpolated timing recovery circuit which generates synchronous sample values. Interpolated timing recovery is less sensitive to noise in the read signal and it is not adversely affected by process variations in fabrication. Consequently, bit synchronization can be maintained even though the data is recorded using a long k constraint, for example k>8.

The synchronous samples output by interpolated timing recovery are input into a trellis sequence detector having a state transition diagram configured according to whether the read channel is reading the user data or the ECC redundancy symbols. In the preferred embodiment, the state transition diagram is also matched to the code constraints of one or both of the user data and ECC redundancy channel codes. This minimizes the bit error rate in the detected binary data sequence output by the sequence detector, thereby reducing the burden on the ECC code which would otherwise have to correct the errors before decoding the channel data.

The estimated binary sequence output by the sequence detector is buffered in a data buffer to facilitate the error detection and correction process, and to allow for retroactive and split-segment symbol synchronization. A sector of data is recorded with a primary sync mark at the beginning, and at least one secondary sync mark recorded within the data and/or at the end of the sector. When the primary sync mark is undetectable, the entire sector may still be symbol-synchronized using the secondary sync mark. Because the estimated binary sequence output by the sequence detector is buffered, the data preceding the secondary sync mark can be retroactively synchronized using the secondary sync mark. Furthermore, if the primary and secondary sync marks are both detectable, but bit synchronization is lost between the sync marks, the data can be synchronized in split-segments with erasure pointers generated at the location where bit synchronization is lost.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Data Format

Figure 1A:
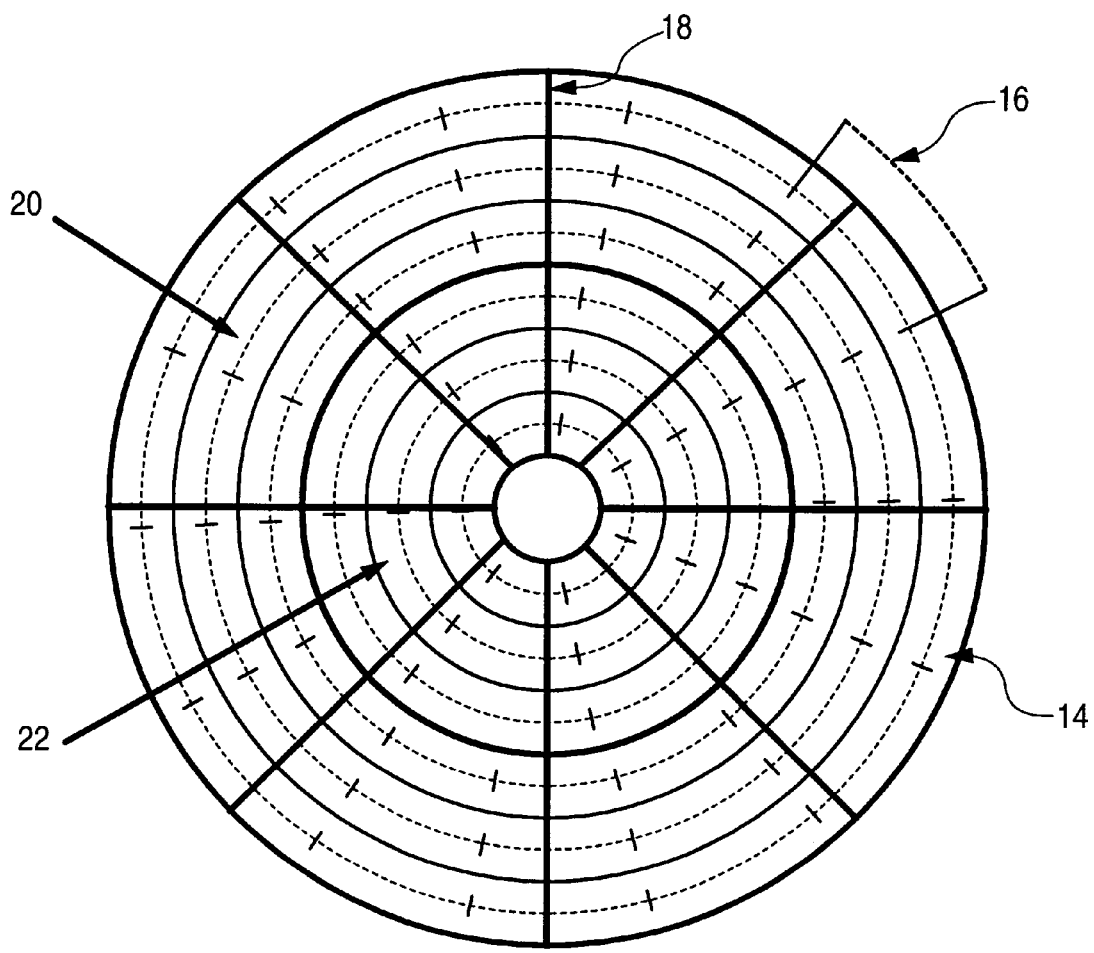
FIG. 1A shows an exemplary format of a disk storage medium comprised of concentric data tracks in multiple zones, where each data track comprises a plurality of data sectors.

FIG. 1A shows a conventional data format of a magnetic disk storage medium comprising a series of concentric, radially spaced data tracks 14, wherein each data track 14 comprises a plurality of sectors 16 with embedded servo wedges 18. A servo controller (not shown) processes the servo data in the servo wedges 18 and, in response thereto, positions a read/write head over a selected track. Additionally, the servo controller processes servo bursts within the servo wedges 18 to keep the head aligned over a centerline of the selected track while writing and reading data. The servo wedges 18 may be detected by a simple discrete-time pulse detector or by the discrete-time sequence detector of FIG. 6. The format of the servo wedges 18 includes a preamble and a sync mark, similar to the user data sectors 16 described below with reference to FIG. 1B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 1A where the disk is partitioned into an outer zone 20 comprising fourteen data sectors per track, and an inner zone 22 comprising seven data sectors per track. In practice, the disk may actually be partitioned into several zones at varying data rates.

Figure 1B:
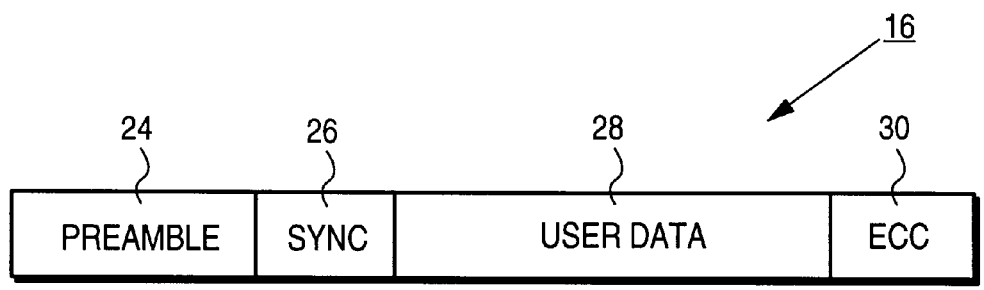
FIG. 1B shows an exemplary format of a data sector, comprising a timing recovery acquisition preamble, a sync mark, user data, and appended ECC redundancy symbols.
Figure 2:
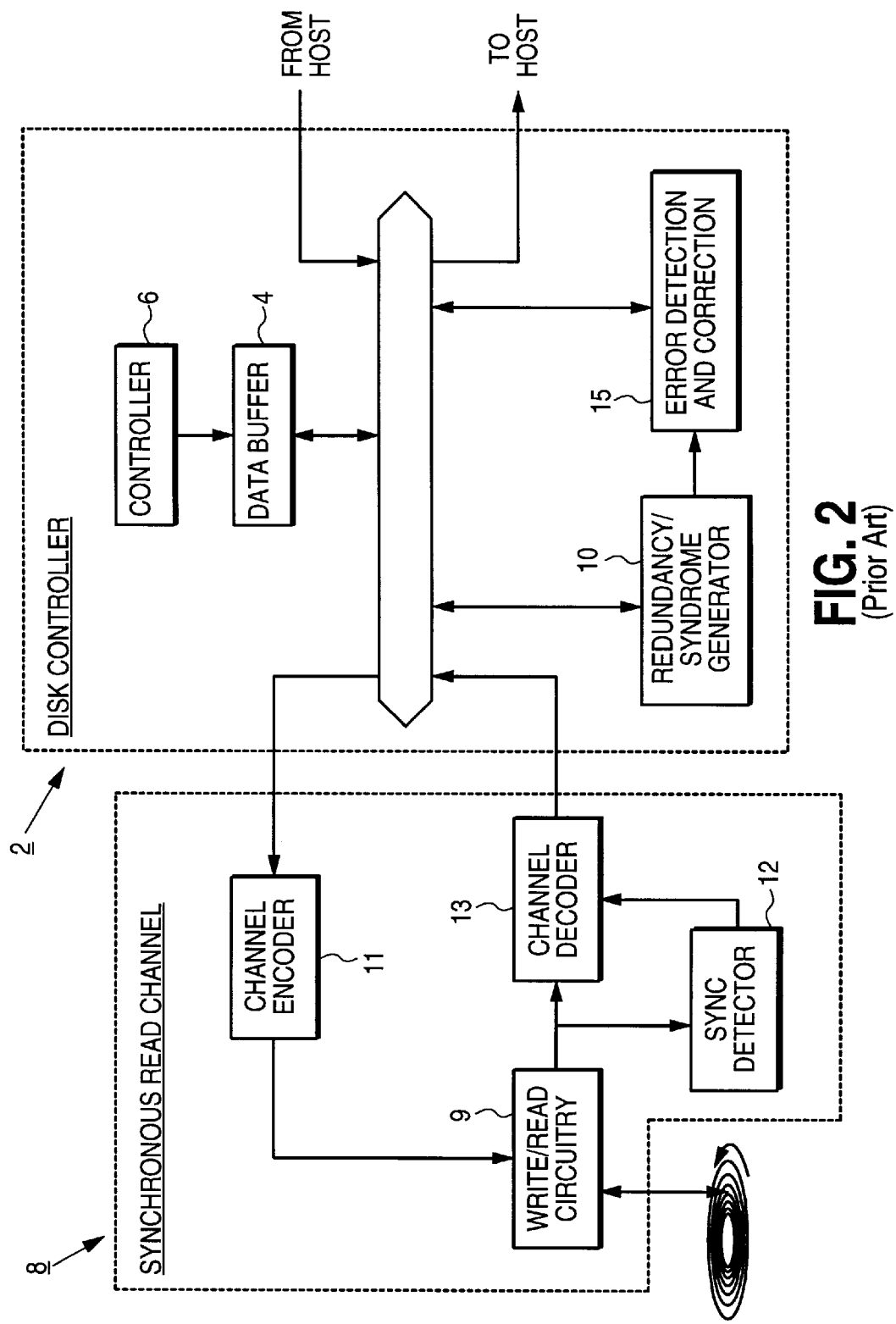
FIG. 2 shows a conventional data path in a disk storage device, including a disk controller for encoding/decoding the user data according to an ECC code, and a synchronous read channel for encoding/decoding the ECC coded data according to a channel code.

FIG. 1B shows the format of a conventional data sector 16 comprised of an acquisition preamble 24, a sync mark 26, and a data field 28 including appended ECC bytes 30 for use in detecting and correcting errors in the user data upon readback. Timing recovery 110 of FIG. 6 processes the acquisition preamble 24 to acquire the correct data frequency and phase before reading the user data field 28, and the sync mark 26 demarks the beginning of the user data field 28 for use in symbol synchronization.

System Overview

Figure 3:
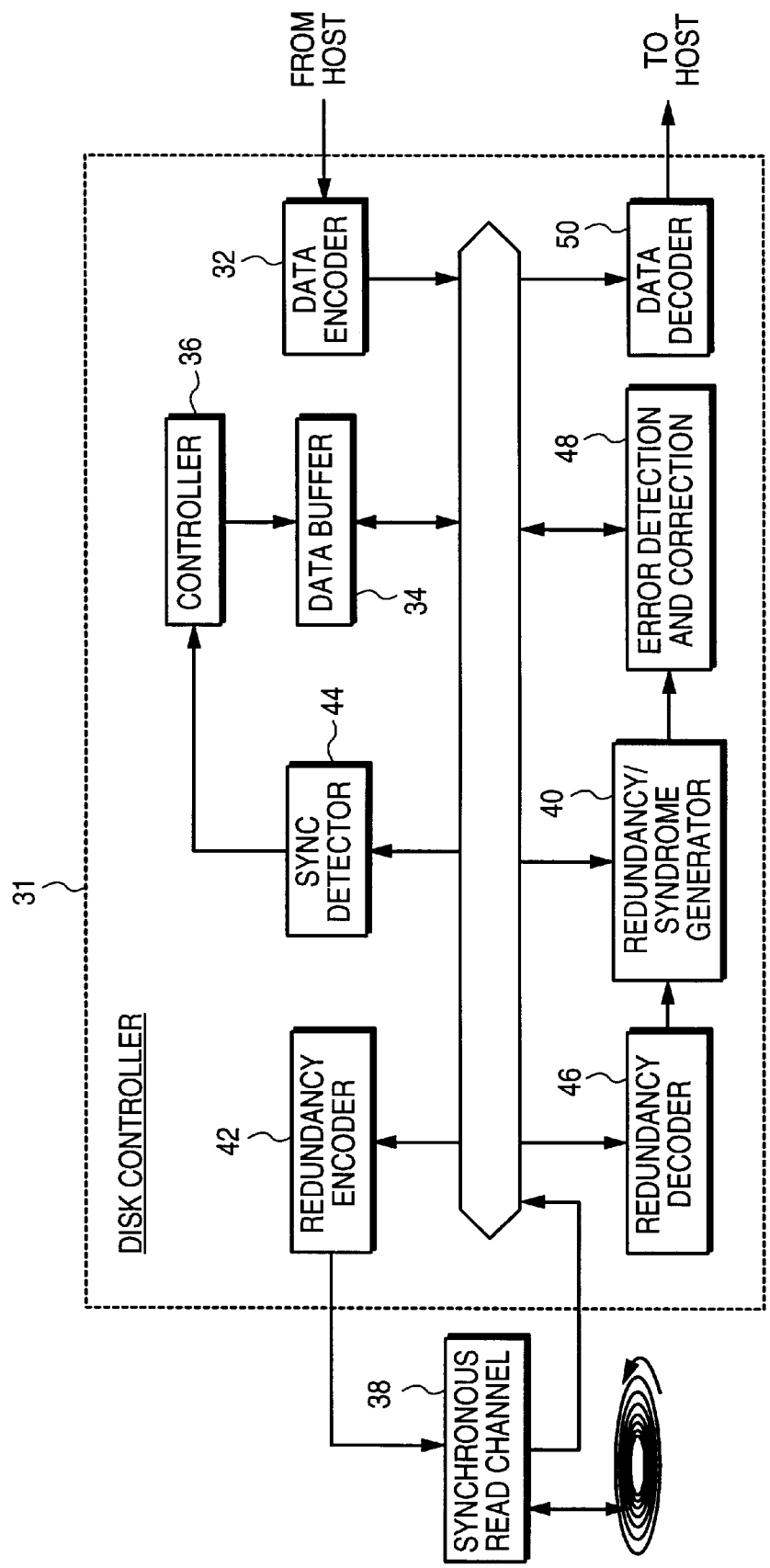
FIG. 3 shows the data path of the present invention which encodes the user data using a first channel code, then encodes the channel encoded user data using an ECC code, and finally encodes the ECC redundancy symbols using a second channel code.

FIG. 3 schematically illustrates the disk storage system according to an embodiment of the present invention. During a write operation, a disk controller 31 receives user data from a host system which is encoded by a data encoder 32 according to a first channel code (e.g., a first RLL (d,k) code) without regard to error propagation in order to achieve a high code rate. Also in the preferred embodiment, the channel code implements a RLL k constraint of k>8 which enables the use of longer block lengths. The encoded user data is then stored in a data buffer 34, access to which is arbitrated by a controller 36. If large enough, the data buffer 34 may optionally implement a conventional disk caching function. The encoded user data is then read from the data buffer 34 and transferred to a synchronous read channel 38 wherein the data is written to the disk. As the encoded user data is transferred to the synchronous read channel 38, it is processed concurrently by a redundancy generator 40 which generates ECC redundancy symbols according to an ECC code, such as a Reed-Solomon code. The ECC redundancy symbols are encoded by a redundancy encoder 42 according to a second channel code (e.g., a second RLL (d,k) code) having low error propagation (and a low code rate). The encoded ECC redundancy symbols are appended to the encoded user data, and the resulting data sector is then written to the disk.

During a read operation, the synchronous read channel 38 samples the analog read signal emanating from the read head, and a discrete-time sequence detector, such a Viterbi sequence detector, detects an estimated binary sequence from the sample values. The estimated binary sequence is transmitted to the disk controller where it is stored in the data buffer 34. A sync detector 44 detects the sync mark (or sync marks) in order to symbol synchronize the estimated binary sequence stored in the data buffer 34. As discussed in greater detail below, the sync mark detector 44 may implement retroactive and/or split-segment symbol synchronization by detecting multiple sync marks recorded in the estimated binary sequence. Once symbol-synchronized, a redundancy decoder 46 reads and decodes the encoded ECC redundancy symbols stored in the data buffer 34. A syndrome generator 40 processes the encoded user data stored in the data buffer 34 and the decoded ECC redundancy symbols to generate ECC error syndromes. An error detection and correction circuit 48 processes the ECC error syndromes to detect errors and generate correction values which are used to correct the encoded user data stored in the data buffer 34. After correcting the encoded user data stored in the data buffer 34, a data decoder 50, which implements the reverse operation of the data encoder 32, decodes the encoded user data as it is transferred from the data buffer 34 to the host system.

Because the error correction process is carried out on the channel encoded user data, the aforementioned problem with error propagation is not a factor. Therefore, the data encoder/decoder 32 and 50 can implement a high rate channel code without regard to error propagation. Furthermore, the synchronous read channel 38 of the present invention employs interpolated timing recovery which is less sensitive to noise and not affected by process variations in fabrication. Consequently, the channel code for encoding the user data can comprise a long k constraint (e.g., k>8), thereby allowing for increased block lengths and a higher code rate.

Figure 4:
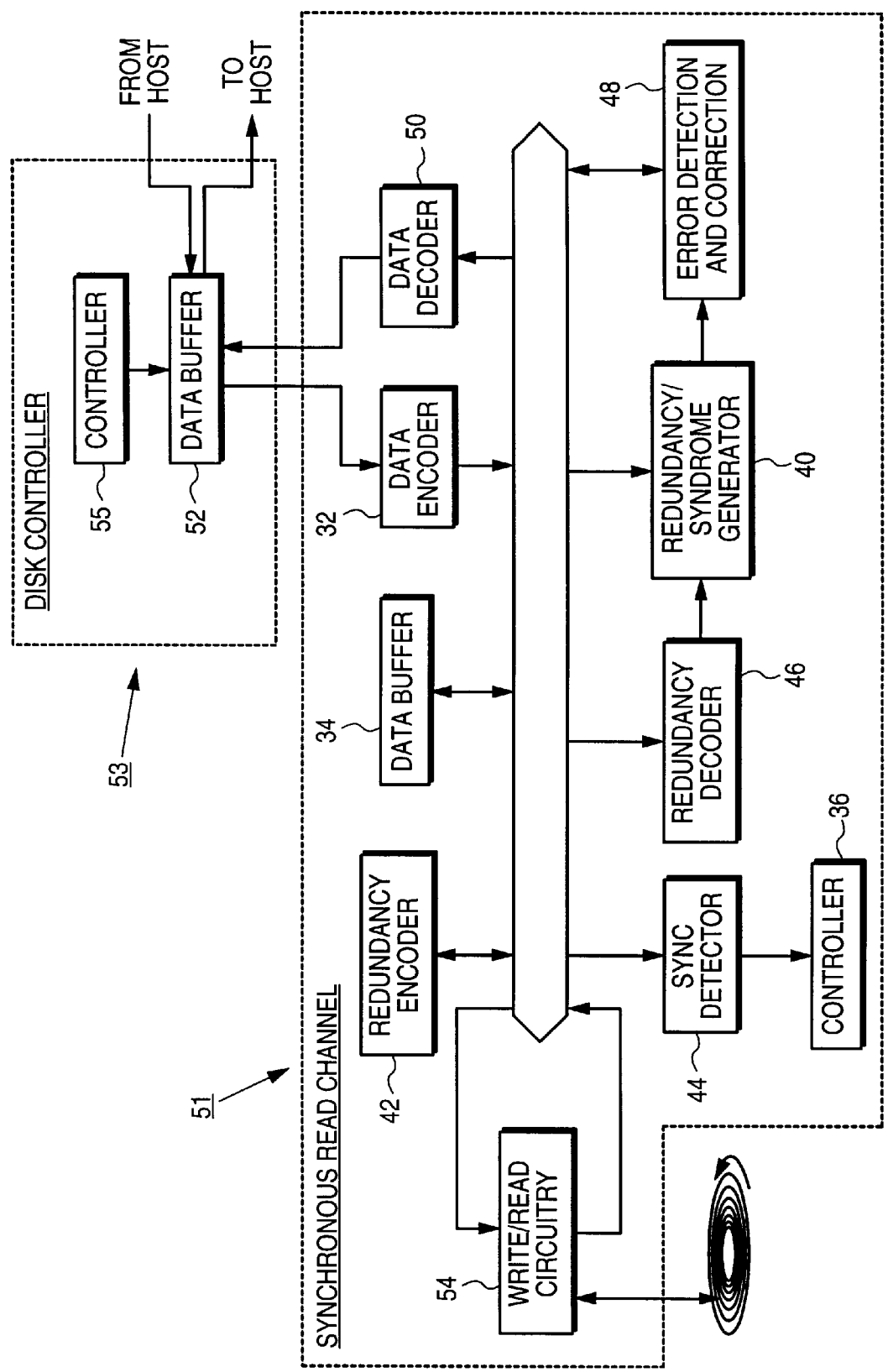
FIG. 4 shows an alternative embodiment of the present invention wherein the data encoding/decoding and error correction operations are implemented within the synchronous read channel.

An alternative embodiment of the present invention is shown in FIG. 4. In this embodiment, the buffering, channel encoding/decoding, and error correction functions are implemented in the synchronous read channel 51. The operation is substantially the same as described above with reference to FIG. 3. In this embodiment, the data buffer 52 in the disk controller 53 implements a disk caching function coordinated by controller 55. The write/read circuitry 54 of the synchronous read channel 38 is described in greater detail below with reference to FIG. 6, and it includes a trellis-code sequence detector configured according to whether the read channel is reading the user data or the ECC redundancy symbols.

Trellis-Code Sequence Detector

The synchronous read channel 38 of the present invention employs partial response (PR) equalization and maximum likelihood (ML) sequence detection (e.g., Viterbi sequence detection). To understand the sequence detection operation, consider the trellis sequence detector for a partial response class-IV (PR4) read channel. The transfer function for this channel is represented by the polynomial $(1-D^2)$ where D is a delay operator referring to the channel or baud rate. With the input symbols a(n) taking on the values +1 or −1, the output channel samples take on values in the set $\{+2,0,-2\}$. A trellis sequence detector, such as a Viterbi sequence detector for PR4, operates by examining the channel samples in context to determine a most likely estimated data sequence associated with the samples.

Figure 5A:
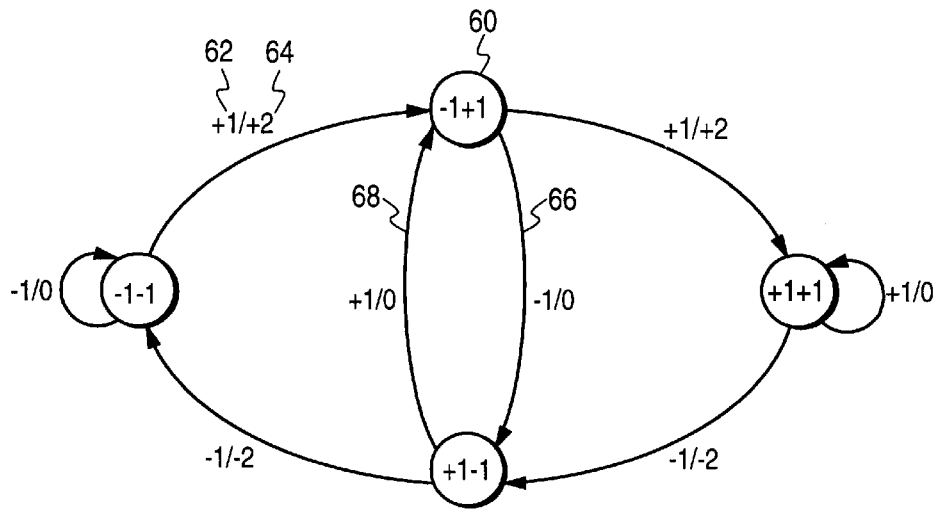
FIG. 5A is a state transition diagram for a conventional PR4 sequence detector.

Operation of the PR4 sequence detector is understood from its state transition diagram shown in FIG. 5A. Each state 60 is represented by the last two input symbols a(n) 62 (after preceding), and each branch from one state to another is labeled with the current input symbol a(n) 62 and the corresponding sample value 64 it will produce during readback. Thus, during readback the sample sequence can be demodulated into the input symbol sequence a(n) (recorded sequence) according to the state transition diagram. However, noise in the read signal due to timing errors, miss-equalization, etc., will obfuscate the readback sample values and introduce ambiguity in the correct demodulated data sequence. The function of the sequence detector, then, is to resolve this ambiguity by demodulating the sample values into a most likely data sequence.

Figure 5B:
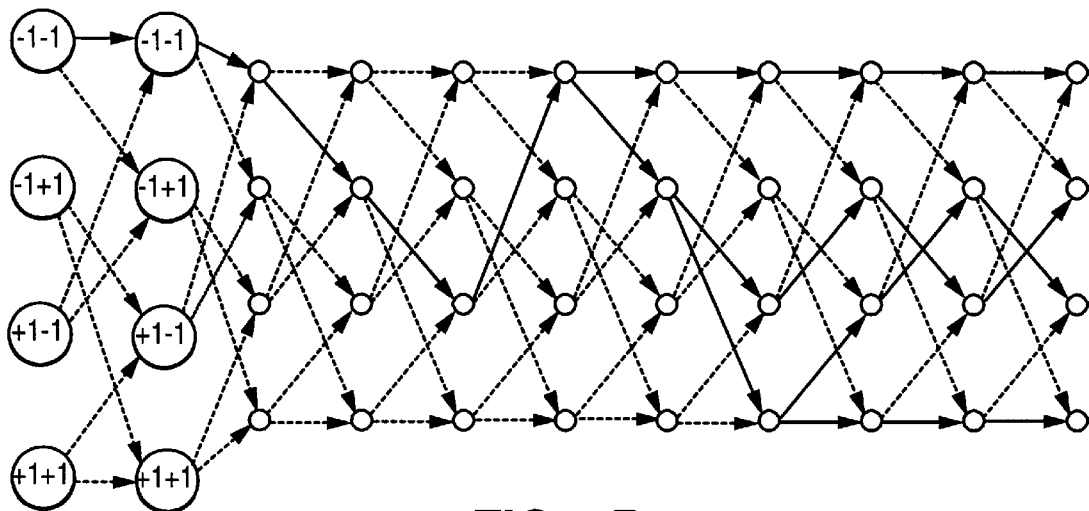
FIG. 5B is the corresponding trellis diagram for the PR4 state transition diagram of FIG. 5A.

The demodulation process of the sequence detector is understood by representing the state transition diagram of FIG. 5A as a trellis diagram shown in FIG. 5B. The trellis diagram represents a time sequence of sample values and the possible recorded input sequences a(n) that could have produced the sample sequence. For each possible input sequence a(n), an error metric is computed relative to a difference between the sequence of expected sample values that would have been generated in a noiseless system and the actual sample values read from the channel. For instance, a Euclidean metric is computed as the accumulated square difference between the expected and actual sample values. The input sequence a(n) that generates the smallest Euclidean metric is the most likely sequence to have created the actual sample values; this sequence is therefore selected as the output of the sequence detector.

To facilitate the demodulation process, the sequence detector comprises path memories for storing each of the possible input sequences a(n) and a corresponding metric. A well known property of the sequence detector is that the paths storing the possible input sequences will "merge" into a most likely input sequence after a certain number of sample values are processed (as long as the input sequence is appropriately constrained). In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

The "merging" of path memories is understood from the trellis diagram of FIG. 5B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric. As a result, the paths through the trellis corresponding to the branches not selected will merge into the paths that were selected. Eventually, all of the survivor sequences will merge into one path through the trellis which represents the most likely estimated data sequence to have generated the sample values as shown in FIG. 5B.

The performance of the sequence detector can be enhanced by encoding the input data according to a predetermined constraint, and then modifying the state transition diagram of the sequence detector to "match" the code constraint. Consider, for example, an RLL code constraint of d=1, meaning that the sequence of two consecutive "1" bits is forbidden. The PR4 state transition diagram of FIG. 5A could be matched to the d=1 constraint by deleting the two inner branches, 66 and 68, since consecutive "1" bits cannot appear in the detected output sequence. With these branches deleted, the bit error rate of the sequence detector decreases because the number of possible output sequences decreases (i.e., the Euclidean distance between certain valid sequences increases). Matching the state transition diagram of the sequence detector to a particular code constraint is commonly referred to as trellis coded modulation (TCM).

In the present invention, the sequence detector in the synchronous read channel is configured to match one or both of the code constraints in the data and redundancy channel codes to minimize the bit error rate of the sequence detector. The sequence detector is configured by the controller 36 of FIG. 3 or FIG. 4 according to whether the read channel is reading the user data 28 or the ECC redundancy symbols 30 of FIG. 1B. Reconfiguring the sequence detector is carried out relative to the sync mark 26; that is, after detecting the sync mark 26 the sequence detector is configured according to the code constraints of the user data 28. At the end of the user data 28, the sequence detector is reconfigured according to the code constraints of the ECC redundancy symbols 30. In an alternative embodiment, separate sequence detectors could be employed for detecting the user data and ECC redundancy symbols independently, but this embodiment would require more hardware.

Furthermore, the sequence detector may be "matched" to the code constraints of the user data channel code, as described above, but may not be matched to the code constraints of the ECC redundancy channel code. That is, the sequence detector may be reconfigured to account for the change in the code constraints when detecting the ECC redundancy symbols, but it may not necessarily be matched to the code constraints of the ECC redundancy channel code in a trellis code sense. In this manner, the complexity of the sequence detector for detecting the ECC redundancy symbols can be minimized.

Synchronous Read Channel

Figure 6:
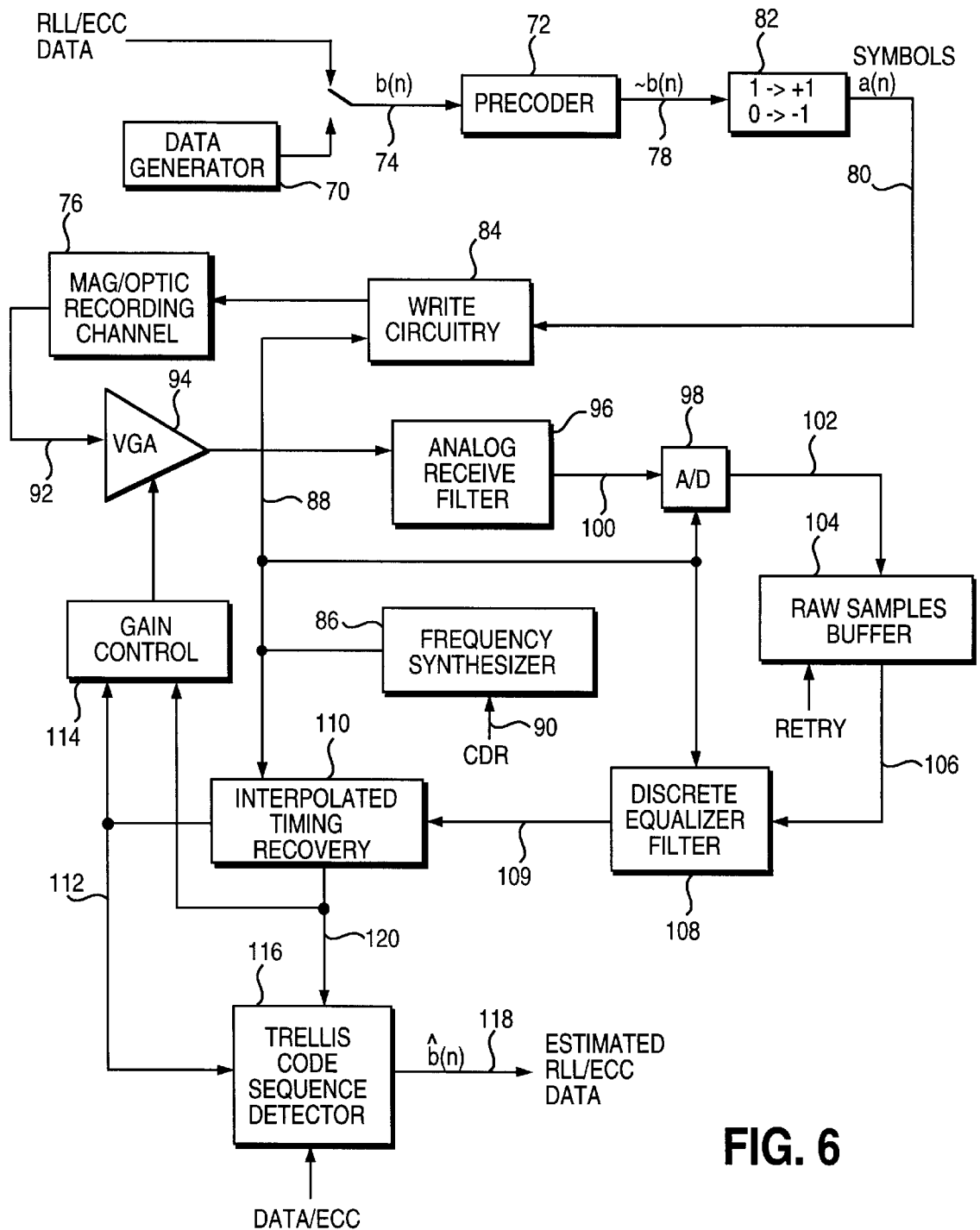
FIG. 6 is a block diagram of the synchronous read channel of the present invention employing a raw samples buffer to facilitate retry operations, interpolated timing recovery tolerant to long k constraints, and a sequence detector having a state transition diagram configured according to whether the read channel is reading the user data or the ECC redundancy symbols.

Referring now to FIG. 6, shown is a detailed block diagram of a synchronous read channel 38 of FIG. 3, and the write/read circuitry 54 in the synchronous read channel 51 of FIG. 4. During a write operation, the read channel receives the channel encoded user/ECC data (e.g., RLL encoded user/ECC data) to be stored to the disk. A data generator 70 generates the preamble 24 of FIG. 1B (for example 2T preamble data) written to the disk prior to writing the user data 28. The data generator also generates a primary sync mark and at least one secondary sync mark, both for use in symbol synchronizing to the user data during a read operation. A precoder 72 precodes the binary sequence b(n) 74 in order to compensate for the transfer function of the recording channel 76 and equalizing filters to form a precoded sequence ~b(n) 78. The precoded sequence ~b(n) 78 is converted into symbols a(n) 80 by translating 82 ~b(N)=0 into a(N)=−1, and ~b(N)=1 into a(N)=+1. Write circuitry 84, responsive to the symbols a(n) 80, modulates the current in the recording head coil (or intensity of a laser beam) at the zone baud rate to record a sequence of transitions onto the disk 76, wherein the transitions represent the recorded data. A frequency synthesizer 86 provides a baud rate write clock 88 to the write circuitry 84 and is adjusted by a baud or channel data rate signal (CDR) 90 according to the zone the recording head is over.

When reading the recorded binary sequence from the disk, a servo control system (not shown) positions the recording head over a selected track. The recording head senses the transitions on the disk and generates polarity alternating pulses in an analog read signal 92 representing the recorded data. A variable gain amplifier 94 adjusts the amplitude of the analog read signal 92, and an analog receive filter 96 attenuates aliasing noise and provides initial equalization toward the desired partial response. A sampling device 98 (normally an analog-to-digital converter (A/D)) samples the analog read signal 100 output by the analog filter 96. The frequency synthesizer 86 generates a sampling clock 88 at a frequency slightly above the baud rate of the current zone (i.e., slightly above the write frequency for the current zone). The sampling clock 88 cycles at a fixed frequency rather than synchronous with the baud rate as in the prior art. Hence, the sampling device 98 samples the analog read signal 100 a synchronously to generate a sequence of asynchronous discrete-time sample values 102. The asynchronous sample values 102 are buffered in a raw samples buffer 104 to facilitate retry operations without having to reread the data sector on the disk. The method of the present invention for performing retries using samples stored in the raw samples buffer 104 is described in more detail below.

As the asynchronous sample values 106 are read from the raw samples buffer 104, a discrete-time equalizer filter 108 equalizes the sample values 106 according to the desired partial response (PR4, EPR4, EEPR4, etc.) . The asynchronous, equalized samples 109 are then interpolated by an interpolated timing recovery (ITR) circuit 110 to generate sample values 112 synchronized to the baud rate. The ITR circuit 110 comprises a time-varying finite-impulse-response (FIR) interpolation filter described in more detail below.

In an alternative embodiment, the analog read signal 100 is sub-sampled (sampled significantly below the baud rate). The sub-sampled values are then "up-sampled" by ITR 110 to generate sample values synchronized to the baud rate. The aliasing noise caused by sub-sampling (sampling below the Nyquist rate) is reduced by lowering the cutoff frequency of the analog receive filter 96. However, this reduction in the signal spectrum increases the bit error rate of the sequence detector. To compensate for this undesirable effect, a channel code is employed to "code out" the input sequences adversely affected by truncating the signal spectrum. For example, a simple but effective code constraint is a RLL d=1 constraint. Another example of a channel code that enhances the performance of the sequence detector in the presence of sub-sampling is disclosed in the above referenced U.S. patent application entitled "TRELLIS CODING SYSTEM FOR DISC STORAGE SYSTEMS." In any event, because the error correction code (ECC) operates on the channel encoded data, the block length (and code rate) for the sub-sampled channel code can be increased because error propagation in the channel decoder is avoided.

Continuing now with the circuitry disclosed in FIG. 6, a gain control circuit 114 processes the synchronous sample values 112 in a decision directed feed back system in order to adjust the gain of the VGA 94, and thereby match the amplitude of the analog read signal 92 to the desired partial response. The synchronous sample values 112 are ultimately input into a discrete-time trellis-code sequence detector 116, such as a maximum likelihood (ML) Viterbi detector that operates according to a state transition diagram matched to the data and ECC redundancy channel codes. The interpolated timing recovery circuit 110 generates a data clock 120 that is synchronized on average to the baud rate, for clocking operation of the gain control circuit 114 and sequence detector 116.

As described above, the state transition operation of the sequence detector 116 is adjusted by the controller 36 of FIG. 3 or FIG. 4 over a DATA/ECC control line depending on whether the read channel is reading the user data 28 or the ECC symbols 30 of FIG. 1. The estimated binary sequence ^b(n) 118 detected by the sequence detector 116 is ultimately transferred to the data buffer 34 of FIG. 3 or FIG. 4, where errors made by the sequence detector 116 are corrected by the error detection and correction circuit 48.

Conventional Timing Recovery

Figure 7:
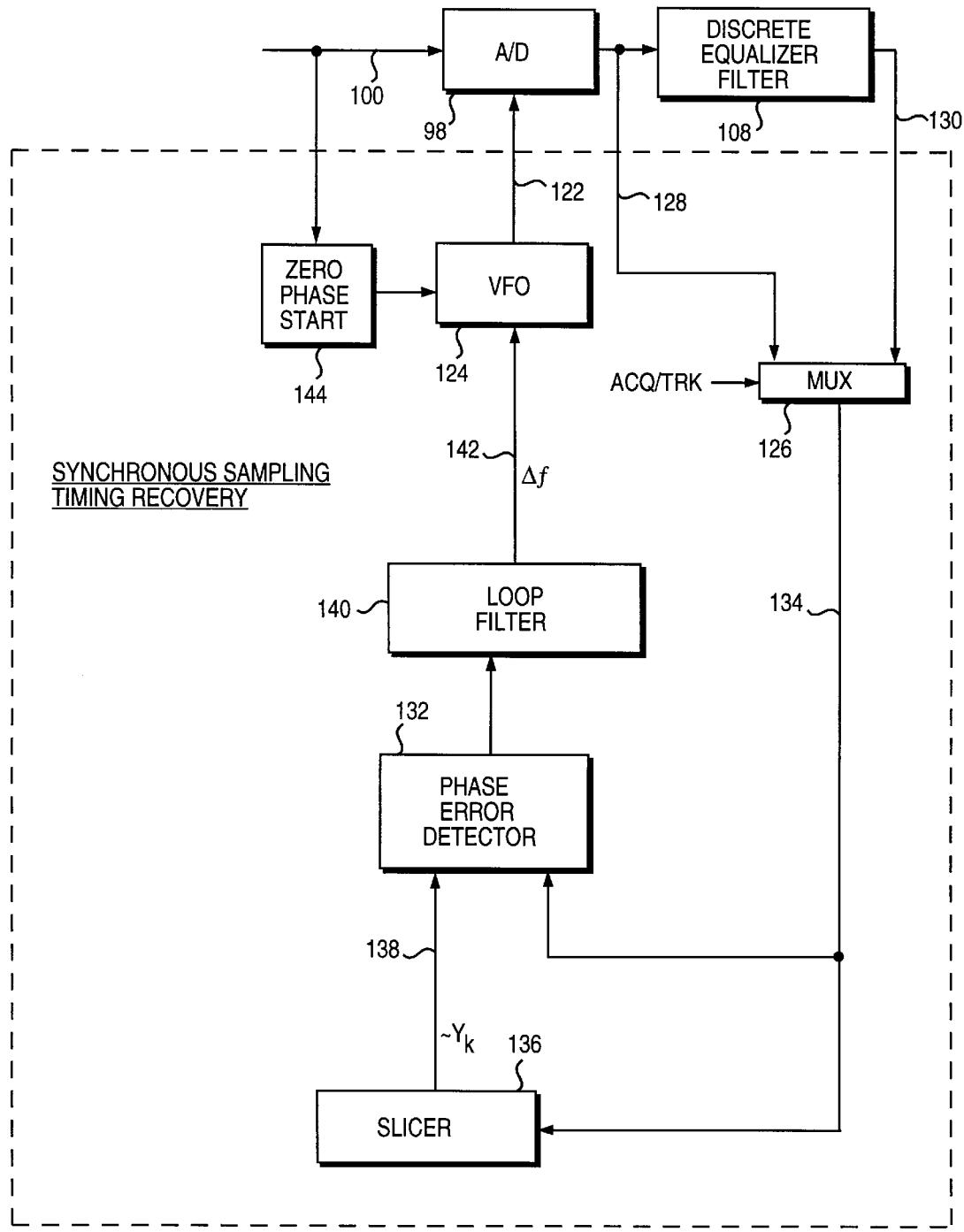
FIG. 7 is a block diagram of a conventional synchronous-sampling timing recovery circuit.

An overview of conventional synchronous-sampling timing recovery typically employed in the prior art read channels is shown in FIG. 7. The function of this circuit is to synchronize the sampling of the analog read signal to the baud rate (code bit rate) using a phase-lock loop (PLL). The output 122 of a variable frequency oscillator (VFO) 124 controls the sampling clock of the sampling device 98 which is typically an analog-to-digital converter (A/D) in digital read channels. A multiplexor 126 selects the unequalized sample values 128 when reading the acquisition preamble 24 of FIG. 1B and the equalized sample values 130 when reading the user data 28. Consequently, the discrete equalizer filter 108 is removed from the timing loop during acquisition in order to avoid its associated latency.

A phase error detector 132 generates a sampling phase error in response to the sample values received over line 134 and estimated sample values $~Y_k$ from a sample value estimator 136, such as a slicer in a d=0 PR4 read channel, over line 138. A loop filter 140 filters the phase error to generate a frequency offset $\Delta f$ 142 that settles to a value proportional to a frequency difference between the sampling clock 122 and the baud rate. The frequency offset $\Delta f$ 142 adjusts the sampling clock 122 at the output of the VFO 124 in order to synchronize the sampling to the baud rate.

A zero phase restart (ZPR) 144 circuit suspends operation of the VFO 124 at the beginning of acquisition in order to minimize the initial phase error between the sampling clock 122 and the analog read signal 100. This is achieved by disabling the VFO 124, detecting a zero crossing in the analog read signal 100, and re-enabling the VFO 124 after a predetermined delay between the detected zero crossing and the first baud rate sample.

Interpolated Timing Recovery

Figure 8:
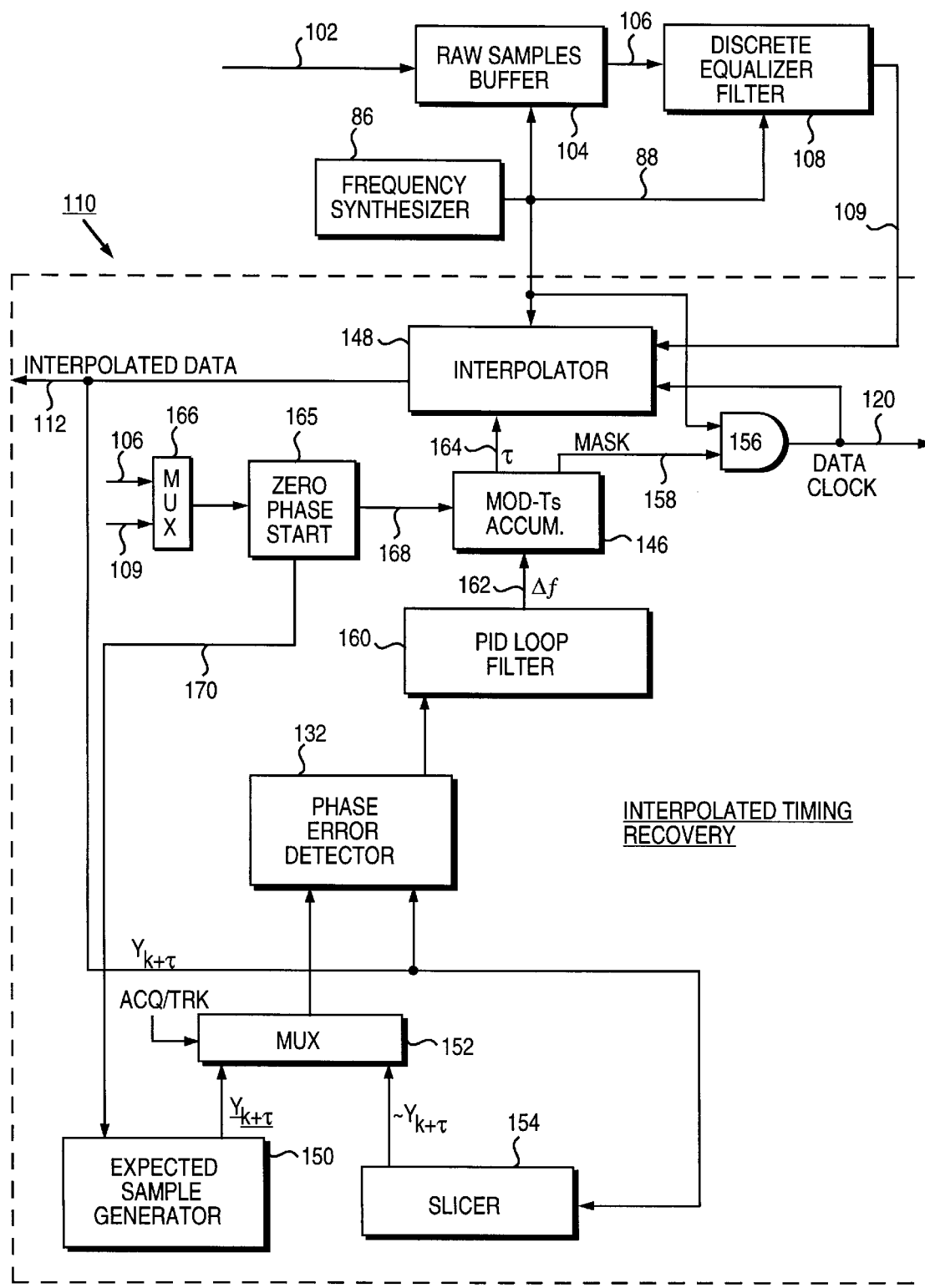
FIG. 8 is a block diagram of the interpolated timing recovery circuit of the present invention.

FIG. 8 shows details of the interpolated timing recovery circuit 110 of the present invention. The VFO 124 in the conventional timing recovery of FIG. 7 is replaced with a modulo-Ts accumulator 146 and an interpolator 148. In addition, an expected sample value generator 150, generates expected samples $Y_{k+\tau}$ used by the phase error detector 132 to compute the phase error during acquisition. A multiplexor 152 selects the estimated sample values $\sim Y_{k+\tau}$ from the slicer 154 for use by the phase error detector 132 during tracking. The data clock 120 is generated at the output of an AND gate 156 in response to the asynchronous sampling clock 88 and a mask signal 158 generated by the modulo-Ts accumulator 146 as discussed in further detail below. The phase error detector 132 and the slicer 154 process interpolated sample values 112 at the output of the interpolator 148 rather than the channel sample values 109 at the output of the discrete equalizer filter 108 as in FIG. 7. A PID loop filter 160 controls the closed loop frequency response, similar to the loop filter 140 of FIG. 7, and generates a frequency offset signal $\Delta f$ 162. The frequency offset $\Delta f$ is accumulated by the modulo-Ts accumulator 146 to generate an interpolation interval $\tau$ 164 for use by the interpolator 148 in computing the interpolated sample values 112.

In the interpolated timing recovery of the present invention, locking a VFO to a reference frequency before acquiring the preamble is not necessary. Further, the sampling device 98 and the discrete equalizer filter 108, together with their associated delays, have been removed from the timing recovery loop; it is not necessary to multiplex 126 around the equalizer filter 108 between acquisition and tracking (as in FIG. 7). However, it is still necessary to acquire a preamble before tracking the user data. To this end, a zero phase restart (ZPR) circuit 165 minimizes the initial phase error between the interpolated sample values and the baud rate at the beginning of acquisition similar to the ZPR 144 of FIG. 7. However, rather than suspend operation of a sampling VFO 124, the ZPR 165 for interpolated timing recovery computes an initial phase error $\tau$ from the A/D 104 sample values 106 or the equalized sample values 109 (as selected through multiplexer 166) and loads this initial phase error into the modulo-Ts accumulator 146 over line 168. The ZPR circuit 165 also generates a control signal 170 for initializing the starting state of the expected sample generator 150 as described below.

The interpolator 148, as described in detail below, comprises a time varying FIR filter responsive to the interpolation interval $\tau$ 164 for computing the interpolated sample values. For more details concerning the PID loop filter 160, phase error detector 132, expected sample generator 150, and slicer 154, refer to U.S. patent applications Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control", now abandoned, and 08/701,572 entitled "Improved Timing Recovery For Synchronous Partial Response Recording", now U.S. Pat. No. 5,754,352. A detailed description of the modulo-Ts accumulator 146, data clock 120, and interpolator 148 is provided in the following discussion.

Interpolator

Figure 9:
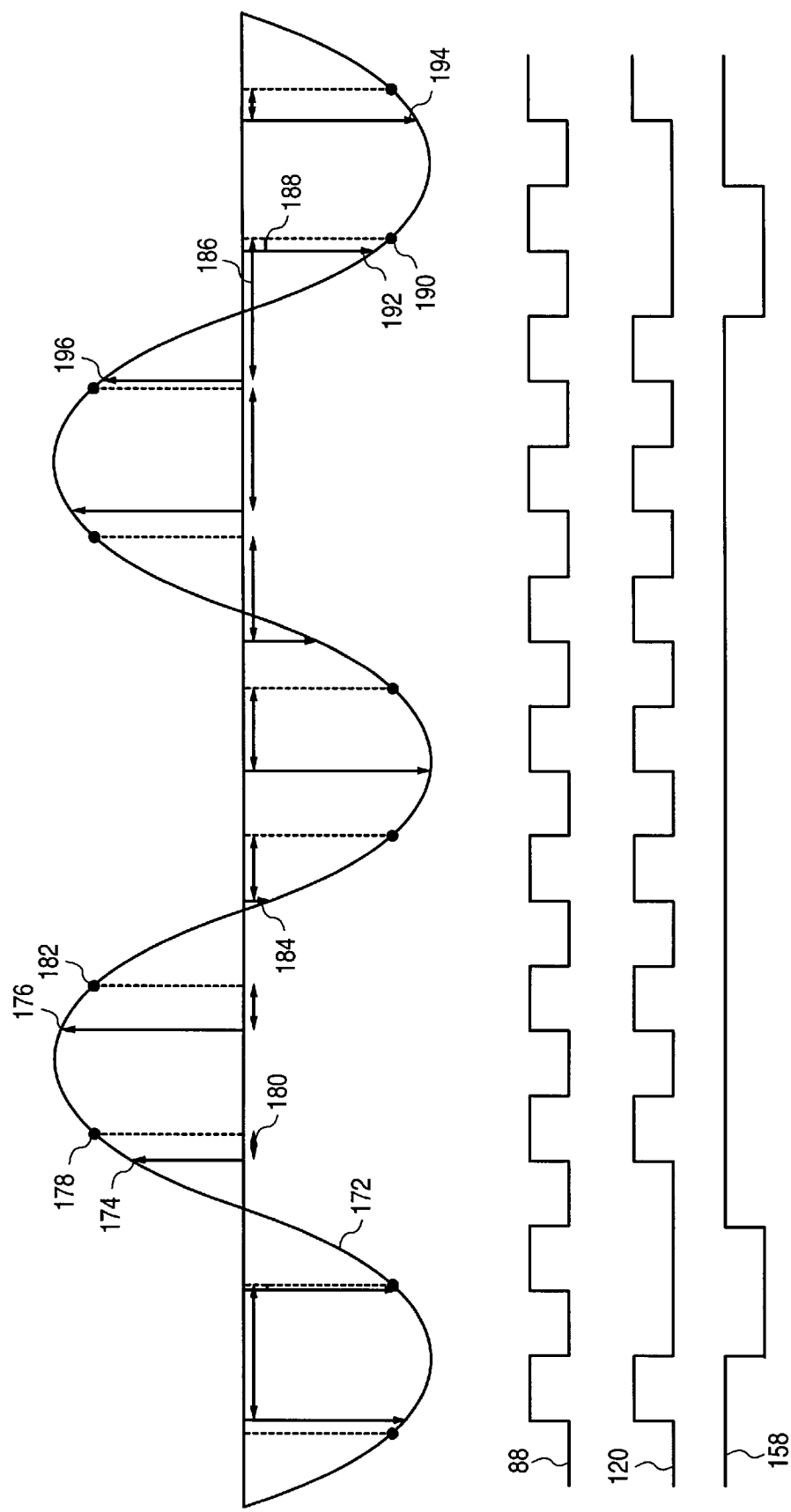
FIG. 9 shows an acquisition preamble signal sampled a synchronously, wherein the asynchronous sample values are interpolated to generate synchronous sample values.

The interpolator 148 of FIG. 8 is understood with reference to FIG. 9 which shows a sampled 2T acquisition preamble signal 172. The target synchronous sample values 112 of FIG. 8 are shown as black circles, and the asynchronous channel sample values 109 output by the discrete equalizer 108 are shown as vertical arrows. Beneath the sampled preamble signal is a timing diagram depicting the corresponding timing signals for the sampling clock 88, the data clock 120 and the mask signal 158. As can be seen in FIG. 9, the preamble signal 172 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1) = x(N-1) + \tau \cdot (x(N) - x(N-1)); \text{ where:} \quad (1)$$

x(N−1) and x(N) are the channel samples surrounding the target sample; and $\tau$ is an interpolation interval proportional to a time difference between the channel sample value x(N−1) and the target sample value. The interpolation interval $\tau$ is generated at the output of modulo-Ts accumulator 146 which accumulates the frequency offset signal $\Delta f$ 162 at the output of the PID loop filter 160:

$$\tau = \left(\sum \Delta f\right) MOD \ Ts \quad (2)$$

where Ts is the sampling period of the sampling clock 88. Since the sampling clock 88 samples the analog read signal slightly faster than the baud rate, it is necessary to mask the data clock every time the accumulated frequency offset $\Delta f$ 162, integer divided by Ts, increments by 1. Operation of the data clock 120 and the mask signal 158 generated by the modulo-Ts accumulator 146 is understood with reference to the timing diagram of FIG. 9.

Assuming the interpolator implements the simple linear equation (1) above, then channel sample values 174 and 176 are used to generate the interpolated sample value corresponding to target sample value 178. The interpolation interval $\tau$ 180 is generated according to equation (2) above. The next interpolated sample value corresponding to the next target value 182 is computed from channel sample values 176 and 184. This process continues until the interpolation interval $\tau$ 186 would be greater than Ts except that it "wraps" around and is actually $\tau$ 188 (i.e., the accumulated frequency offset $\Delta f$ 162, integer divided by Ts, increments by 1 causing the mask signal 158 to activate). At this point, the data clock 120 is masked by mask signal 158 so that the interpolated sample value corresponding to the target sample value 190 is computed from channel sample values 192 and 194 rather than channel sample values 196 and 192.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator 148 is implemented as a filter responsive to more than two channel samples to compute the interpolated sample value.

The ideal discrete-time phase interpolation filter has a flat magnitude response and a constant group delay of $\tau$:

$$C_\tau(e^{j\omega}) = e^{j\omega\tau} \tag{3}$$

which has an ideal impulse response:

$$\sin c(\pi \cdot (n - \tau/T_s)). \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega}) \tag{5}$$

where $\overline{C}_\tau(e^{j\omega})$ is the spectrum of the actual interpolation filter, and $X(e^{j\omega})$ is the spectrum of the input signal. From equation (5), the mean squared error is represented by:

$$E_\tau^2 = \frac{1}{2\pi}\int_{-\pi}^{\pi}|\overline{C}_\tau(e^{j\omega}) - e^{j\omega\tau}|^2 |X(e^{j\omega})|^2 d\omega \tag{6}$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$$|X(e^{j\omega})| = 0, \text{ for } |\omega| \geq \alpha\pi.$$

Then equation (=6) can be expressed as:

$$E_{\tau,\alpha}^2 = \frac{1}{2\pi}\int_{-\alpha\pi}^{\alpha\pi}|\overline{C}_\tau(e^{j\omega}) - e^{j\omega\tau}|^2 |X(e^{j\omega})|^2 d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n)e^{-j\omega n} \tag{8}$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi}\int_{-\alpha\pi}^{\alpha\pi}\left|\sum_{n=-R}^{n=R-1} C_\tau(n)e^{-j\omega n} - e^{j\omega\tau}\right|^2 |X(e^{j\omega})|^2 d\omega. \tag{9}$$

The next step is to take the derivatives of equation (9) with respect to the coefficients $C_\tau(n)$ and set them to zero:

$$\frac{\partial E_{\tau,\alpha}^2}{\partial C_\tau(n_o)} = 0 \text{ for } n_o = -R, \ldots, 0, 1, \ldots, R-1. \tag{10}$$

After careful manipulation, equation (10) leads to:

$$\int_{-\alpha\pi}^{\alpha\pi}\left[\left(\sum_{n=-R}^{n=R-1} C_\tau(n)\cos(\omega(n_o - n))\right) - \cos(\omega(n_o + \tau))\right]|X(e^{j\omega})|^2 d\omega = 0 \tag{11}$$

$$\text{for } n_o = -R, \ldots, 0, 1, \ldots, R-1.$$

Defining $\phi(r)$ as:

$$\phi(r) = \int_{-\alpha\pi}^{\alpha\pi}|X(e^{j\omega})|^2 \cos(\omega r) d\omega \tag{12}$$

and substituting equation (12) into equation (11) gives:

$$\sum_{n=-R}^{n=R-1} C_\tau(n)\phi(n - n_o) = \phi(n_o + \tau) \tag{13}$$

$$\text{for } n_o = -R, \ldots, 0, 1, \ldots, R-1.$$

Equation (13) defines a set of 2R linear equations in terms of the coefficients $C_\tau(n)$. Equation (13) can be expressed more compactly in matrix form:

$$\Phi_T C_\tau = \Phi_\tau$$

where $C_\tau$ is a column vector of the form:

$$C_\tau = [C_\tau(-R), \ldots, C_\tau(0), \ldots, C_\tau(R-1)]^t$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \vdots & & & \vdots \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \tag{14}$$

The solution to equation (14) is:

$$C_\tau = \Phi_T^{-1}\Phi_\tau \tag{15}$$

where $\Phi_T^{-1}$ is an inverse matrix that can be solved using well known methods.

Table 1 shows example coefficients $C_\tau(n)$ calculated from equation (15) with 2R=6, $\alpha$=0.8 and $X(e^{j\omega})$=PR4:

TABLE 1

| τ · 32/Ts | C(-2) | C(-1) | C(0) | C(1) | C(2) | C(3) |
|---|---|---|---|---|---|---|
| 0 | 0.0000 | -0.0000 | 1.0000 | 0.0000 | -0.0000 | 0.0000 |
| 1 | 0.0090 | -0.0231 | 0.9965 | 0.0337 | -0.0120 | 0.0068 |
| 2 | 0.0176 | -0.0445 | 0.9901 | 0.0690 | -0.0241 | 0.0135 |
| 3 | 0.0258 | -0.0641 | 0.9808 | 0.1058 | -0.0364 | 0.0202 |
| 4 | 0.0335 | -0.0819 | 0.9686 | 0.1438 | -0.0487 | 0.0268 |
| 5 | 0.0407 | -0.0979 | 0.9536 | 0.1829 | -0.0608 | 0.0331 |
| 6 | 0.0473 | -0.1120 | 0.9359 | 0.2230 | -0.0728 | 0.0393 |
| 7 | 0.0533 | -0.1243 | 0.9155 | 0.2638 | -0.0844 | 0.0451 |
| 8 | 0.0587 | -0.1348 | 0.8926 | 0.3052 | -0.0957 | 0.0506 |
| 9 | 0.0634 | -0.1434 | 0.8674 | 0.3471 | -0.1063 | 0.0556 |
| 10 | 0.0674 | -0.1503 | 0.8398 | 0.3891 | -0.1164 | 0.0603 |
| 11 | 0.0707 | -0.1555 | 0.8101 | 0.4311 | -0.1257 | 0.0644 |
| 12 | 0.0732 | -0.1589 | 0.7784 | 0.4730 | -0.1341 | 0.0680 |
| 13 | 0.0751 | -0.1608 | 0.7448 | 0.5145 | -0.1415 | 0.0710 |
| 14 | 0.0761 | -0.1611 | 0.7096 | 0.5554 | -0.1480 | 0.0734 |
| 15 | 0.0765 | -0.1598 | 0.6728 | 0.5956 | -0.1532 | 0.0751 |
| 16 | 0.0761 | -0.1572 | 0.6348 | 0.6348 | -0.1572 | 0.0761 |
| 17 | 0.0751 | -0.1532 | 0.5956 | 0.6728 | -0.1598 | 0.0765 |
| 18 | 0.0734 | -0.1480 | 0.5554 | 0.7096 | -0.1611 | 0.0761 |
| 19 | 0.0710 | -0.1415 | 0.5145 | 0.7448 | -0.1608 | 0.0751 |
| 20 | 0.0680 | -0.1341 | 0.4730 | 0.7784 | -0.1589 | 0.0732 |
| 21 | 0.0644 | -0.1257 | 0.4311 | 0.8101 | -0.1555 | 0.0707 |
| 22 | 0.0603 | -0.1164 | 0.3891 | 0.8398 | -0.1503 | 0.0674 |
| 23 | 0.0556 | -0.1063 | 0.3471 | 0.8674 | -0.1434 | 0.0634 |
| 24 | 0.0506 | -0.0957 | 0.3052 | 0.8926 | -0.1348 | 0.0587 |
| 25 | 0.0451 | -0.0844 | 0.2638 | 0.9155 | -0.1243 | 0.0533 |
| 26 | 0.0393 | -0.0728 | 0.2230 | 0.9359 | -0.1120 | 0.0473 |
| 27 | 0.0331 | -0.0608 | 0.1829 | 0.9536 | -0.0979 | 0.0407 |
| 28 | 0.0268 | -0.0487 | 0.1438 | 0.9686 | -0.0819 | 0.0335 |
| 29 | 0.0202 | -0.0364 | 0.1058 | 0.9808 | -0.0641 | 0.0258 |
| 30 | 0.0135 | -0.0241 | 0.0690 | 0.9901 | -0.0445 | 0.0176 |
| 31 | 0.0068 | -0.0120 | 0.0337 | 0.9965 | -0.0231 | 0.0090 |

Figure 10:
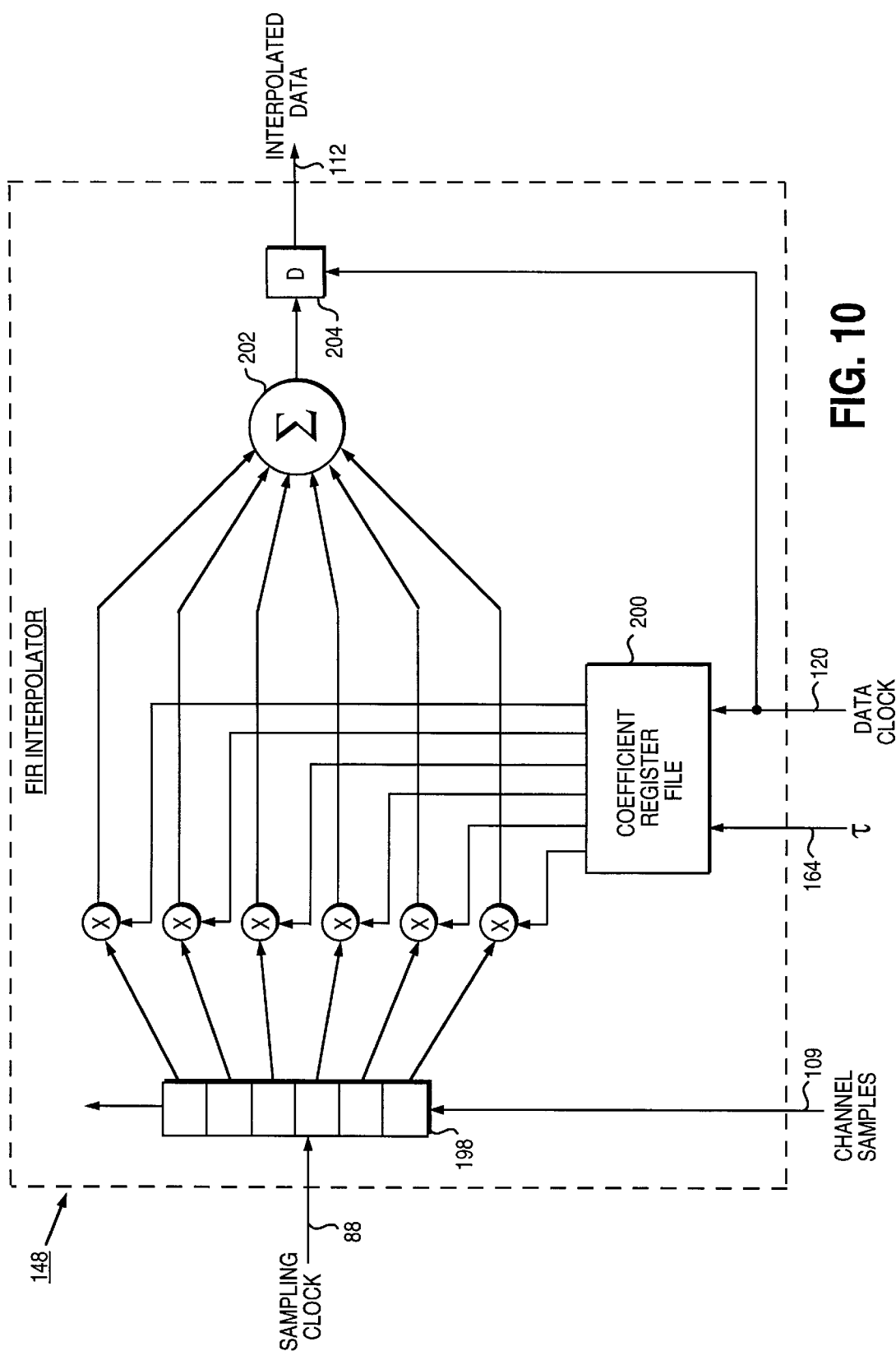
FIG. 10 is a time varying interpolation FIR filter for implementing the timing recovery interpolation function.

FIG. 10 shows an implementation of a six tap FIR filter which operates according to the coefficients shown in Table 1. A shift register 198 receives the channel samples 109 at the sampling clock rate 88. The filter coefficients $C_\tau(n)$ are stored in a coefficient register file 200 and applied to corresponding multipliers according to the current value of τ 164. The coefficients are multiplied by the channel samples 109 stored in the shift register 198. The resulting products are summed 202 and the sum stored in a delay register 204. The coefficient register file 200 and the delay register 204 are clocked by the data clock 120 to implement the masking function described above.

In an alternative embodiment not shown, a plurality of static FTR filters, having coefficients that correspond to the different values of τ, filter the sample values in the shift register 198. Each filter outputs an interpolation value, and the current value of the interpolation interval τ 164 selects the output of the corresponding filter as the output 112 of the interpolator 148. Since the coefficients of one filter are not constantly updated as in FIG. 10, this multiple filter embodiment increases the speed of the interpolator 148 and the overall throughput of the read channel.

Retry Operations

As described above with reference to FIG. 6, the synchronous read channel comprises a raw samples buffer 104 for storing the read signal samples 102 output by the A/D converter 98. In the preferred embodiment, the samples buffer 104 has the capacity to store an entire sector of read signal samples (including the preamble, sync mark, and a postamble for closing out the sequence detector). This facilitates retry operations without having to wait for the disk to complete a revolution and then reread the data sector. In other words, the read channel can make multiple passes over the samples stored in the samples buffer 104 in an effort to recover an otherwise unrecoverable sector. During each pass over the data, a parameter in the read channel is adjusted in order to "fine tune" the performance until the sector is successfully recovered.

There are several read channel parameters that could be adjusted during each pass over the samples stored in the samples buffer 104. For example, the frequency response of the discrete-time equalizer 108 could be adjusted by changing the filter coefficients, the closed loop response of the timing recovery circuit 110 could be adjusted by changing the PID filter 160 coefficients, the closed loop response of the gain control circuit 114 could be adjusted by adjusting its loop filter coefficients (assuming a digital gain control loop), or the target levels of the discrete-time sequence detector 116 could be adjusted to better match the spectrum of the read signal. In a digital gain control loop, the VGA 94 of FIG. 6 is replaced with a digital multiplier that operates on the read signal sample values stored in the samples buffer 104. Thus, the synchronous read channel 38 may comprise an analog gain control circuit 114 for adjusting the gain of the analog read signal via a VGA 94, as well as a digital gain control loop for adjusting the gain of the read signal sample values via a digital multiplier (not shown).

In an alternative embodiment, all of the samples stored in the samples buffer 104 are processed to compute an "average" optimal setting for all of the loop filters. In this manner, the loop filters can operate statically using the computed average or optimal value while reprocessing the samples during the retry operation. In yet another alternative embodiment, the read signal samples stored in the samples buffer 104 could be processed in reverse order which, in some cases, may provide an otherwise unachievable gain in performance. In any event, the goal is to optimize the read channel parameters until the bit error rate of the sequence detector is within the error correction capability of the ECC code.

The controller 36 of FIG. 3 or FIG. 4 initiates a retry operation when the error corrector 48 indicates that the sector stored in the data buffer 34 is uncorrectable. During a retry operation, the controller reprograms a parameter of the read channel 38, activates the RETRY control line of the raw samples buffer 104 in order to reread the buffered sample values, and directs the read channel 38 to re-execute the read operation. This iterative process continues until the number of errors in the sector is within the error correction capability of the ECC.

Retroactive Synchronization

A problem with the conventional sector format of FIG. 1B is that noise in the recording device, due for example to defects in the storage medium, may corrupt the read signal and render the sync mark 26 undetectable. If this happens, the entire sector may be unrecoverable due to the inability to symbol synchronize the data. To overcome this problem, the present invention records multiple sync marks throughout the sector and symbol synchronizes the data using any one of the sync marks.

Figure 11A:
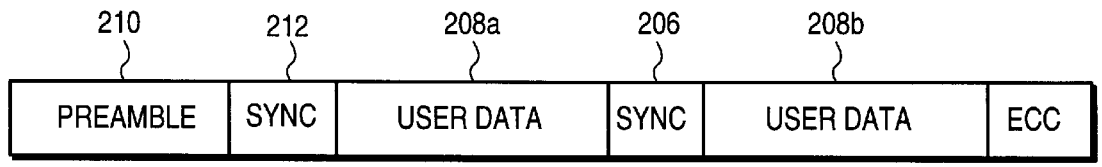
FIG. 11A–11E show various alternative sector formats of the present invention comprising multiple sync marks to facilitate retroactive and split-segment symbol synchronization.

FIG. 11A illustrates an example data sector format of the present invention including a secondary sync mark 206 for use in symbol synchronizing the user data field 208a and 208b in the event that the primary synchronization fields (preamble 210 and/or sync mark 212) are undetectable. The recording area 208a inbetween the primary and secondary sync marks may be void, or it may be filled with user data. In the latter embodiment, to recover the user data 208a inbetween the sync marks when the primary sync mark is undetectable the present invention employs either random symbol error correction, erasure pointer error correction, or retroactive synchronization from the secondary sync mark 206, or any combination thereof. The implementation of erasure pointers and retroactive resynchronization is disclosed in greater detail below.

The primary and secondary sync marks may be selected so as to be error tolerant, meaning there is a high probability of valid detection and a low probability of false detection in the presence of errors and random user data. The extent of error tolerance achievable in a sync mark is proportional to the length of the sync mark pattern. Because the secondary sync mark 206 is utilized only when the primary sync mark 212 is undetectable, in the preferred embodiment the secondary sync mark 206 is selected to be less error tolerant than the primary sync mark 212; that is, the secondary sync mark 206 is selected to be shorter in length than the primary sync mark 212 in order to maximize format efficiency. Also in the preferred embodiment, the secondary sync mark pattern 206 is selected to be a subset of the primary sync mark pattern so that a subset of the circuitry for detecting the primary sync mark can be used to detect the secondary sync mark. Further, the primary and secondary sync marks are differentiated by timing when they occur relative to other sector data (e.g., relative to the primary preamble 210 or to the embedded servo wedges 18 of FIG. 1A). In an alternative embodiment, the primary and secondary sync marks are differentiated by selecting different patterns for each sync mark, but this embodiment requires additional sync mark detection circuitry to detect the different sync mark patterns.

Figure 11B:
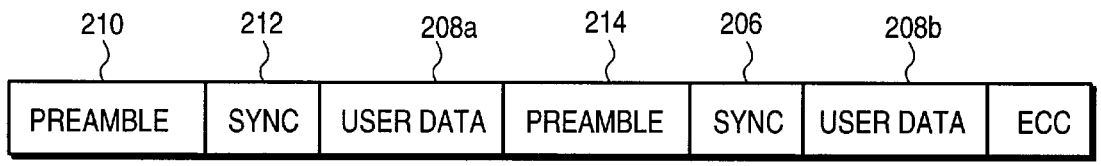

There may be situations where the primary preamble 210 is also corrupted by errors, thereby preventing successful phase lock before reading the primary sync mark 212 and/or the user data. If the gap 208a between the primary and secondary sync mark is filled with user data (to maximize format efficiency), the present invention can process this user data 208a to acquire phase lock; then symbol synchronization is achieved using the secondary sync mark 206 for synchronizing retroactively to the preceding user data 208a as well as to the remainder of the user data 208b. In an alternative data sector format shown in FIG. 11B, a secondary preamble 214 is optionally included before the secondary sync mark for use in acquiring phase lock when the primary preamble 210 is corrupted by errors. This format may be more efficient since phase locking to preamble data is faster than phase locking to random user data. In other words, the gap 208a in between the primary and secondary sync mark may be shorter if a secondary preamble 214 is employed, thereby reducing the number of erasure pointers needed to correct the gap data.

In any case, the present invention provides the secondary preamble 214 as a programmable option which is configured as desired by the end user. Additionally, the gap length 208a in between the primary and secondary sync mark is programmable to allow further customization according to the system requirements. For example, the gap length 208a can be adjusted relative to the number of erasure pointers available for correcting the gap user data.

Figure 11C:
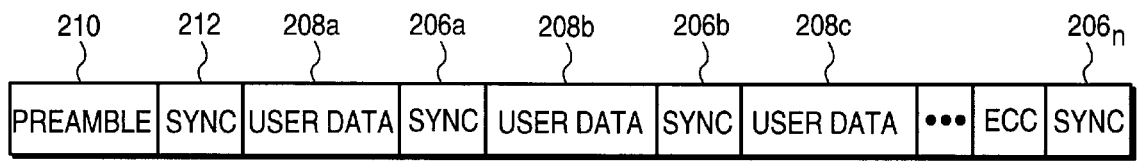

Another aspect of the present invention is the ability to resynchronize to the user data when initial synchronization is lost due, for example, to a loss of frequency lock or slipping one or more cycles in timing recovery. Referring to the data sector format of FIG. 11C, to facilitate resynchronization multiple secondary sync marks 206a, 206b, . . . 206$_n$ are interspersed at regular intervals within the user data field, where the interval length is programmable. Then when synchronization is lost, the system resynchronizes to the data field using the next encountered sync mark. Loss of synchronization is detected when a secondary sync mark is detected at the wrong time relative to the detected user data (i.e., either too soon or too late). In this manner, the present invention can resynchronize to every segment between sync marks using a "split-segment" synchronization technique described below.

Figure 11D:
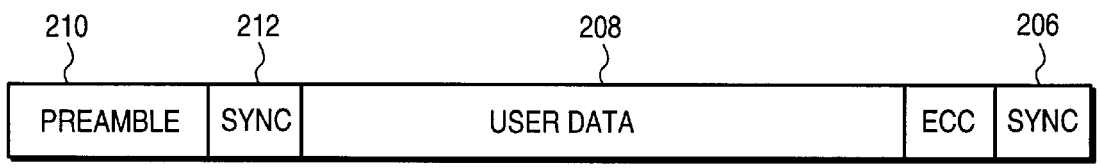

The present invention's use of multiple sync marks can be extended to include a primary sync mark 212 at the beginning of the user data field and a secondary sync mark 206 at the end of the sector as shown in FIG. 11D. If the primary sync mark 212 is undetectable, then the secondary sync mark 206 is used to retroactively synchronize over the entire data sector. And if initial synchronization is lost, the primary and secondary sync marks are used to synchronize respective sections of a data segment preceding and following the loss of synchronization (i.e., "split-segment" synchronization). Again, this aspect of the present invention is described in greater detail below.

Figure 11E:
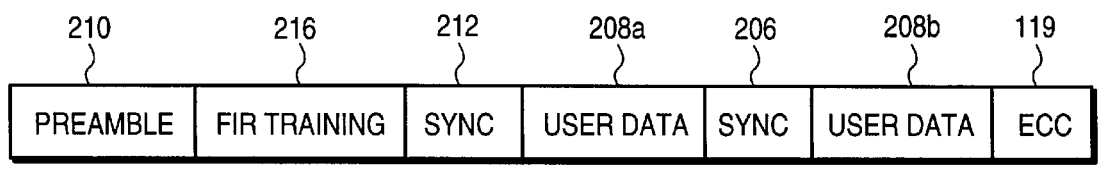

Yet another data sector format provided by the present invention is shown in FIG. 11E. In this format, an FIR training pattern 216 is inserted in between the primary preamble 210 and the primary sync mark 212. This FIR training pattern 216 is used by the synchronous read channel of FIG. 6 when the discrete equalizer 108 is real time adaptive (see U.S. patent application Ser. No. 08/640,410 entitled "Gain and Phase constrained Adaptive Equalizer Filter in a Sampled Amplitude Read Channel for Magnetic Recording"). That is, before attempting to read the primary sync mark and the user data field, the FIR training pattern 216 is processed to determine optimal initial settings for the coefficients of the FIR filter in the discrete equalizer 108.

Thus, the present invention provides a number of different options for the data sector format which can be programmably configured depending on the system requirements, and which provide optimum protection against an inability to symbol synchronize the data in a sector. In addition to providing the ability to retroactively synchronize the sector data using a secondary sync mark, the present invention provides the ability to resynchronize to the sector data using "split-segment" resynchronization as described in the following section.

Split-Segment Resynchronization

Referring again to FIG. 11A–11D, another potential error event when reading the user data is that timing recovery may slip one or more cycles in the timing recovery PLL. In other words, if the initial phase lock is lost, the present invention re-establishes phase lock over the user data, and then re-establishes symbol synchronization to the user data at the next detected secondary sync mark. This aspect of the invention is understood with reference to FIG. 12A and FIG. 12B which illustrate "split-segment" data recovery techniques using secondary sync marks and erasure pointers.

When the timing recovery PLL slips a cycle, the location within the data sector can be determined by examining the phase errors at the output of the phase error detector 132 of FIG. 7 or FIG. 8. That is, when synchronization is lost, it will be reflected in timing recovery as an increase in the phase error. Thus, the timing recovery circuit of the present invention optionally includes a circuit which compares and saves a metric based on the phase error (e.g., the maximum phase error) between sync marks as well as its location within the data sector. Then, when a cycle slips, the phase error metric demarks a "dividing line" for forward synchronizing a first section of a data segment using the first sync mark, and retroactive synchronizing a second section of the data segment using the second sync mark (i.e., "split-segment" synchronization).

Figure 12A:
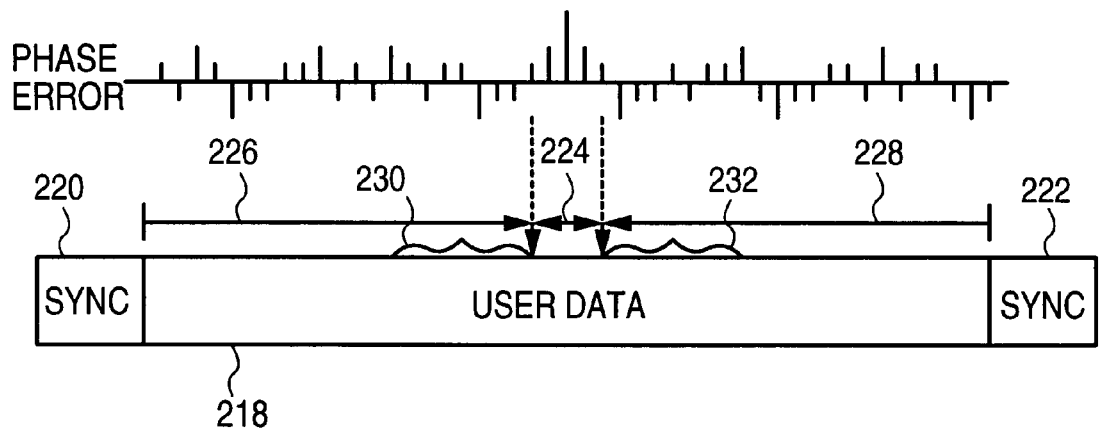
FIG. 12A and 12B illustrate the split-segment symbol synchronization aspect of the present invention.
Figure 12B:
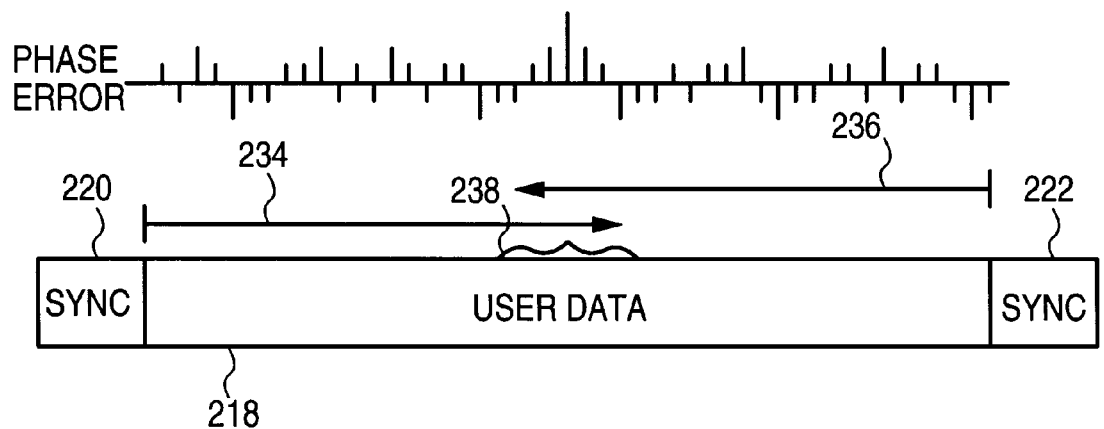

This is illustrated in FIG. 12A and 12B which show a data segment 218 between a first sync mark 220 and a second sync mark 222 and, above that, the corresponding phase errors generated when reading this data. As described above, loss of synchronization is detected when the secondary sync mark 222 is detected at the wrong time (too early or too late) with respect to the detected user data. Because the detected data segment 218 is buffered in the data buffer 34 of FIG. 3 or FIG. 4, the present invention uses both sync marks to synchronize to the data segment 218 toward one another, and toward the maximum phase error. Furthermore, a "window" may be defined around the location of the maximum phase error wherein erasure pointers are generated to assist the EDAC system in correcting this data.

FIG. 12A shows the case where the loss of synchronization results in more data 218 being detected than expected (i.e., the secondary sync mark 222 is detected too late). Consequently, a section 224 of the detected data surrounding the occurrence of the phase error is discarded, and the first and secondary sync marks are used to synchronize to the remaining data. This is accomplished by using the first sync mark 220 to synchronize a first section 226 of the data segment preceding the occurrence of the maximum phase error, and using the secondary sync mark 222 to synchronize a second section 228 of the data segment following the occurrence of the maximum phase error. Additionally, erasure pointers 230 and 232 may be generated corresponding to a predetermined number of the synchronized data symbols near the occurrence of the maximum phase error.

FIG. 12B shows the case where the loss of synchronization results in less data 218 being detected than expected (i.e., the secondary sync mark 222 is detected too early). In this case, the detected data synchronized using the first and secondary sync marks overlaps to account for the truncation. That is, the first sync mark 220 synchronizes a first section 234 of the data segment extending through the occurrence of the maximum phase error, and the second sync mark 222 synchronizes an overlapping second section 236 of the data segment also extending through the occurrence of the maximum phase error. As in FIG. 12A, a predetermined number of erasure pointers 238 defined around the maximum phase error can also be generated to assist in error correction.

In the event that the maximum phase error is not well defined, or if the circuit for storing the maximum phase error is not employed, then an alternative method is to select an arbitrary location in the data segment 218 and to synchronize relative to that point. Then, during retry operations, the selected location can be adjusted until the data segment 218 is successfully recovered. For instance, the default may be to initially synchronize toward the center of the data segment 218, and then adjust the "error" location left and right from the center during retry operations.

The above "split-segment" synchronization technique of the present invention applies to a sector format that includes multiple secondary sync marks (FIG. 11C) or only one secondary sync mark at the end of the sector (FIG. 11D). That is, the data segment 218 of FIG. 11A and 1B may be one segment of multiple segments, or it may be the entire sector.

The data buffer 34 of FIG. 3 or FIG. 4 can be advantageously used to implement retroactive and split-segment synchronization of the present invention. As the estimated data sequence is output by the sequence detector and stored in the data buffer 34, the sync detector 44 attempts to detect the primary and secondary sync marks. The sync detector 44 notifies the controller 36 when the sync marks are detected, and the controller 36 executes the necessary steps to carry out the retroactive or split-segment synchronization as described above. Once the data stored in the data buffer 34 is symbol-synchronized, the controller 36 begins the error detection and correction procedures.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

We claim:

1. A disk storage device for recording data onto and reading data from a disk medium, comprising:

(a) a data encoder, connected to receive user data from a host system, for encoding the user data according to a first channel code to generate coded user data;

(b) a redundancy generator, connected to receive the coded user data, for generating redundancy symbols;

(c) a redundancy encoder, connected to receive the redundancy symbols, for encoding the redundancy symbols according to a second channel code to generate coded redundancy symbols;

(d) a synchronous read channel for writing the coded user data and the coded redundancy symbols to the disk medium and for detecting estimated data from discrete-time sample values generated by sampling an analog read signal emanating from a read head positioned over the disk medium;

(e) a data buffer connected to receive estimated coded user data from the synchronous read channel;

(f) a redundancy decoder, connected to receive estimated coded redundancy symbols from the synchronous read channel, for decoding the estimated coded redundancy symbols into estimated redundancy symbols;

(g) a syndrome generator, connected to receive the estimated coded user data and the estimated redundancy symbols, for generating error syndromes;

(h) an error detection and correction system, connected to receive the coded user data from the data buffer and connected to receive the error syndromes, for detecting and correcting errors in the estimated coded user data to generate corrected coded user data; and (i) a data decoder, connected to receive the corrected coded user data, for decoding the corrected coded user data into corrected user data transferred to the host system.

2. The disk storage device as recited in claim 1, wherein the data encoder and data decoder implement a first run-length limited (RLL) code.

3. The disk storage device as recited in claim 2, wherein the redundancy encoder and redundancy decoder implement a second run-length limited (RLL) code different from the first run-length limited (RLL) code.

4. The disk storage device as recited in claim 2, wherein the first run-length limited code is a RLL (d,k) code.

5. The disk storage device as recited in claim 4, wherein k>8.

6. The disk storage device as recited in claim 1, wherein the synchronous read channel comprises a discrete-time trellis sequence detector.

7. The disk storage device as recited in claim 6, wherein:
(a) the data encoder and data decoder implement a trellis code; and
(b) the trellis sequence detector operates according to a state transition diagram matched to the trellis code.

8. The disk storage device as recited in claim 6, wherein:
(a) the redundancy encoder and redundancy decoder implement a trellis code; and
(b) the trellis sequence detector operates according to a state transition diagram matched to the trellis code.

9. The disk storage device as recited in claim 6, wherein:
(a) the trellis sequence detector operates according to a first state transition diagram when detecting the estimated coded user data; and
(b) the trellis sequence detector operates according to a second state transition diagram when detecting the estimated coded redundancy symbols.

10. The disk storage device as recited in claim 1, wherein the synchronous read channel comprises:
(a) a sampling device for a synchronously sampling the analog read signal to generate asynchronous sample values; and
(b) interpolated timing recovery for interpolating the asynchronous sample values to generate synchronous sample values.

11. The disk storage device as recited in claim 10, wherein the data encoder and data decoder implement a run-length limited (d,k) code where k>8.

12. The disk storage device as recited in claim 1, further comprising:
(a) a sync mark detector for detecting a primary sync mark and secondary sync mark in the estimated data output by the synchronous read channel; and
(b) a controller, responsive to the sync mark detector, for retroactively symbol synchronizing the estimated coded user data stored in the data buffer after the sync detector detects the secondary sync mark when the primary sync mark is undetectable.

13. The disk storage device as recited in claim 1, further comprising:
(a) a sync mark detector for detecting a primary sync mark and secondary sync mark in the estimated data output by the synchronous read channel; and
(b) a controller, responsive to the sync mark detector, for symbol synchronizing a first segment of the estimated coded user data stored in the data buffer in a forward direction using the primary sync mark, and for symbol synchronizing a second segment of the estimated coded user data stored in the data buffer in a reverse direction using the secondary sync mark.

14. The disk storage device as recited in claim 13, wherein:
(a) the data buffer comprises a third segment of estimated decoded user data located between the first and second segments of estimated coded user data; and
(b) erasure pointers are generated corresponding to the third segment of estimated coded user data.

15. The disk storage device as recited in claim 13, wherein:
(a) the first and second segments of the estimated coded user data overlap at least partially; and
(b) erasure pointers are generated corresponding to the overlap.

16. The disk storage device as recited in claim 1, wherein the error detection and correction system processes the estimated coded user data stored in the data buffer using an iterative procedure.

17. The disk storage device as recited in claim 16, wherein:
(a) the error detection and correction system reads at least part of the estimated coded user data from the data buffer during each iteration of the iterative procedure; and
(b) the iterative procedure is executed at least twice.

18. The disk storage device as recited in claim 17, wherein a location of an erasure pointer into the estimated coded user data is adjusted during at least one of the iterations.

19. A method for recording data onto and reading data from a disk medium, comprising the steps of:
(a) encoding user data, received from a host system, according to a first channel code to generate coded user data;
(b) encoding the coded user data to generate redundancy symbols;
(c) encoding the redundancy symbols according to a second channel code to generate coded redundancy symbols;
(d) writing the coded user data and the coded redundancy symbols to the disk medium;
(e) detecting estimated coded user data from discrete-time sample values generated by sampling an analog read signal emanating from a read head positioned over the disk medium;
(f) storing the estimated coded user data in a data buffer;
(g) detecting estimated coded redundancy symbols from discrete-time sample values generated by sampling an analog read signal emanating from a read head positioned over the disk medium;
(h) decoding the estimated coded redundancy symbols into estimated redundancy symbols;
(i) generating error syndromes using the estimated coded user data and the estimated redundancy symbols;
(j) reading the coded user data from the data buffer and, using the error syndromes, detecting and correcting errors in the estimated coded user data to generate corrected coded user data; and
(k) decoding the corrected coded user data into corrected user data transferred to the host system.

20. The method as recited in claim 19, wherein the step of detecting and correcting errors in the estimated coded user data comprises the steps of:
(l) reading at least part of the estimated coded user data from the data buffer;
(m) processing the estimated coded user data read from the data buffer;
(n) checking whether errors in the estimated coded user data remain after the processing in step (m); and
(o) repeating steps (l) and (m) if errors in the estimated coded user data are detected in step (n).

21. The method as recited in claim 20, wherein step (o) further comprises the step of adjusting a location of an erasure pointer into the estimated coded user data.

22. A disk storage device for reading data from a disk medium, comprising:
(a) a sampling device for sampling an analog read signal from a recording head positioned over the disk medium to generate a sequence of discrete-time sample values;
(b) a samples buffer connected to receive a plurality of the discrete-time sample values;

(c) discrete-time timing recovery for extracting timing information from the discrete-time sample values;

(d) a discrete-time sequence detector for detecting a binary sequence from the discrete-time sample values; and (e) a controller for iteratively transferring the plurality of discrete-time sample values stored in the samples buffer to the discrete-time sequence detector and setting a programmable parameter to a different value until a bit error rate of the sequence detector is below a predetermined level.

23. The storage device as recited in claim 22, wherein the programmable parameter is a timing recovery parameter.

24. The storage device as recited in claim 23, wherein:

(a) the sampling device samples the analog read signal asynchronously to generate asynchronous sample values;

(b) the discrete-time timing recovery comprises an interpolator for interpolating the asynchronous sample values to generate synchronous sample values; and (c) the discrete-time sequence detector detects the binary sequence from the synchronous sample values.

25. The storage device as recited in claim 22, further comprising a discrete-time equalizer for equalizing the discrete-time sample values according to a partial response, wherein the programmable parameter is a discrete-time equalizer parameter.

26. The storage device as recited in claim 22, further comprising an automatic gain control circuit for adjusting a gain of the read signal to a nominal value, wherein the programmable parameter is a gain control parameter.

27. The storage device as recited in claim 26, wherein the automatic gain control circuit comprises a discrete-time multiplier for multiplying the discrete-time sample values stored in the samples buffer by a discrete-time gain value.

28. The storage device as recited in claim 22, wherein the programmable parameter is a discrete-time sequence detector parameter.

29. The storage device as recited in claim 22, wherein the controller transfers the plurality of discrete-time sample values to the discrete-time sequence detector in reverse order during at least one of the iterations.

30. A method for reading data from a disk medium, comprising:

(a) sampling an analog read signal from a recording head positioned over the disk medium to generate a sequence of discrete-time sample values;

(b) storing a plurality of the discrete-time sample values in a samples buffer;

(c) extracting timing information from the discrete-time sample values;

(d) detecting a binary sequence from the discrete-time sample values;

(e) iteratively transferring the plurality of discrete-time sample values stored in the samples buffer to the discrete-time sequence detector and setting a programmable parameter to a different value until the bit error rate of the sequence detector is below a predetermined level.

31. The method as recited in claim 30, wherein the programmable parameter is a timing recovery parameter.

32. The method as recited in claim 31, wherein:

(a) the step of sampling comprises the step of a synchronously sampling the analog read signal to generate asynchronous sample values;

(b) the step of extracting timing information comprises the step of interpolating the asynchronous sample values to generate synchronous sample values; and (c) the step of detecting comprises the step of detecting the binary sequence from the synchronous sample values.

33. The method as recited in claim 30, further comprising the step of equalizing the discrete-time sample values according to a partial response, wherein the programmable parameter is an equalizing parameter.

34. The method as recited in claim 30, further comprising the step of adjusting a gain of the read signal to a nominal value, wherein the programmable parameter is a gain control parameter.

35. The method as recited in claim 34, wherein the step of adjusting the gain of the read signal to a nominal value comprises the step of multiplying the sample values stored in the samples buffer by a discrete-time value.

36. The method as recited in claim 30, wherein the programmable parameter is a discrete-time sequence detector parameter.

37. The method as recited in claim 30, wherein the step of iteratively transferring comprises the step of transferring the plurality of discrete-time sample values to the discrete-time sequence detector in reverse order during at least one of the iterations.

* * * * *